US012791512B2

(12) United States Patent
Makita et al.

(10) Patent No.: US 12,791,512 B2
(45) Date of Patent: Nov. 10, 2026

(54) ELECTROLYTE ANALYSIS DEVICE AND ELECTROLYTE ANALYSIS METHOD

(71) Applicant: OMRON HEALTHCARE CO., LTD., Muko (JP)

(72) Inventors: Maya Makita, Kyoto (JP); Tatsuya Kobayashi, Kyoto (JP); Hideyuki Yamashita, Kyoto (JP); Kazuya Kitayama, Kyoto (JP); Seiji Fukunaga, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 188 days.

(21) Appl. No.: 18/439,796

(22) Filed: Feb. 13, 2024

(65) Prior Publication Data

US 2024/0183816 A1 Jun. 6, 2024

Related U.S. Application Data

(63) Continuation of application No. PCT/JP2023/003596, filed on Feb. 3, 2023.

(30) Foreign Application Priority Data

Feb. 18, 2022 (JP) ................................ 2022-024118

(51) Int. Cl.
*G01N 27/333* (2006.01)

(52) U.S. Cl.
CPC .................................. *G01N 27/333* (2013.01)

(58) Field of Classification Search
CPC ...... G01N 27/26; G01N 27/30; G01N 27/333; G01N 27/416
See application file for complete search history.

(56) References Cited

U.S. PATENT DOCUMENTS

2014/0105788 A1* 4/2014 Iwamoto ................ G01N 27/27 422/82.02
2020/0116664 A1 4/2020 Abeyrathne et al.
(Continued)

FOREIGN PATENT DOCUMENTS

AU 2014202161 A1 * 11/2014 ......... G01N 27/3273
JP 61-96363 U 6/1986
(Continued)

OTHER PUBLICATIONS

Official Communication issued in International Patent Application No. PCT/JP2023/003596, mailed on Aug. 29, 2024, 2 pages.
(Continued)

*Primary Examiner* — C. Sun
(74) *Attorney, Agent, or Firm* — Keating & Bennett, LLP

(57) ABSTRACT

An electrolyte analysis device includes a substrate extending in one direction, a main base portion provided on a main surface of the substrate, an ion selective film provided to be in contact with the main base portion so as to cover the main base portion, and an auxiliary base portion provided on the substrate. In a state where the electrolyte is in contact with a side of one end of the substrate so as to cover the side of the one end, a peeling determination unit obtains a potential of the main base portion and a potential of the auxiliary base portion, respectively. Whether or not the ion selective film is peeled from the main base portion is determined based on a potential difference between an obtained potential of the main base portion and an obtained potential of the auxiliary base portion.

9 Claims, 8 Drawing Sheets

(56) References Cited

U.S. PATENT DOCUMENTS

| | | | | |
|---|---|---|---|---|
| 2020/0309726 | A1* | 10/2020 | Heinz-Erian ........ | G01N 27/327 |
| 2022/0404310 | A1 | 12/2022 | Matsushita et al. | |

FOREIGN PATENT DOCUMENTS

| | | | |
|---|---|---|---|
| JP | 2014-95675 | A | 5/2014 |
| JP | 2014-95692 | A | 5/2014 |
| JP | 6127460 | B2 | 5/2017 |
| JP | 2021-18141 | A | 2/2021 |
| JP | 2022-508683 | A | 1/2022 |

OTHER PUBLICATIONS

English Translation of Official Communication issued in International Patent Application No. PCT/JP2023/003596, mailed on Mar. 28, 2023, 3 pages.

Official Communication issued in International Patent Application No. PCT/JP2023/003596, mailed on Mar. 28, 2023.

* cited by examiner

ELECTROLYTE ANALYSIS DEVICE AND ELECTROLYTE ANALYSIS METHOD

CROSS-REFERENCE TO RELATED APPLICATIONS

This is a continuation application of International Application No. PCT/JP2023/003596, with an International filing date of Feb. 3, 2023, which claims priority of Japanese Patent Application No. 2022-024118 filed on Feb. 18, 2022, the entire content of which is hereby incorporated by reference.

TECHNICAL FIELD

The present invention relates to an electrolyte analysis device and an electrolyte analysis method each for measuring a concentration of ions contained in an electrolyte.

BACKGROUND ART

Conventionally, as an electrolyte analysis device of this type, there is known a device including a sensor head and a main body to which the sensor head is mounted, for example, as disclosed in Patent Document 1 (JP 6127460 B2). The sensor head includes, on a substrate, a first ion selective electrode that selects a first ion species and produces a potential corresponding to a concentration of the first ion species, and a second ion selective electrode that selects a second ion species and produces a potential according to a concentration of the second ion species. A CPU is mounted on the main body. With the sensor head mounted to the main body, an electrolyte (a standard solution whose concentration ratio is known, or a measurement target solution such as urine) is brought into "contact" with a region on the sensor head where the first and second ion selective electrodes are provided, and the CPU calculates a potential difference between the first ion selective electrode and the second ion selective electrode as a concentration ratio between the first ion species and the second ion species.

The first ion selective electrode includes a conductive first electrode layer, and a first ion selective film provided to be in contact with the first electrode layer so as to cover the first electrode layer. The second ion selective electrode includes a conductive second electrode layer, and a second ion selective film provided to be in contact with the second electrode layer so as to cover the second electrode layer. In a typical example, the first ion selective film has a property of selectively allowing a sodium ion ($Na^+$) as a first ion to pass therethrough, without allowing water to pass therethrough. The second ion selective film has a property of allowing a potassium ion ($K^+$) as a second ion to pass therethrough, without allowing water to pass therethrough. The first and second ion selective films are each formed by dropping a solution containing a specific organic material onto corresponding one of the first and second electrode layers, and naturally drying the solution.

SUMMARY OF THE INVENTION

In a case where a user improperly handles the sensor head (for example, when the first and/or second ion selective films is rubbed), a part or all of the first and/or second ion selective films may be peeled from the first and/or second electrode layers.

The first and second ion selective films are usually transparent. The sensor head is made small to be disposable.

In Patent Document 1, diameters of the first and second ion selective films are set to about several millimeters. Thus, there is a problem that it is difficult for a user to visually determine whether the first and/or second ion selective films are/is peeled from the first and/or second electrode layers, for example. When a measurement is performed in a state where it is uncertain whether or not the first and/or second ion selective films are/is peeled as described above, reliability of measurement result is questionable.

Thus, an object of the present invention is to provide an electrolyte analysis device and an electrolyte analysis method capable of determining whether or not an ion selective film is peeled from an electrode layer as a base.

In order to achieve the object, an electrolyte analysis device of the present disclosure is an electrolyte analysis device for measuring a concentration of ions contained in an electrolyte, the electrolyte analysis device comprising:

a substrate extending in one direction from one end to an other end;

a main electrode layer including a main base portion and a main extension portion provided on one main surface of a pair of main surfaces of the substrate, the main base portion being provided in a specific region on a side of the one end in the one direction, the main extension portion extending from the main base portion to a side of the other end;

an ion selective film provided to be in contact with the main base portion so as to cover the main base portion in the specific region, the ion selective film having a property of selectively allowing the ions to pass through the ion selective film; and an auxiliary electrode layer including an auxiliary base portion and an auxiliary extension portion provided on the one main surface or an other main surface of the pair of main surfaces of the substrate, the auxiliary base portion being provided in an auxiliary region different from the specific region and on the side of the one end in the one direction, the auxiliary extension portion extending from the auxiliary base portion to the side of the other end, wherein the auxiliary electrode layer is disposed in a state separated from the main electrode layer, and the electrolyte analysis device further comprises a peeling determination unit that obtains, in a state where the electrolyte is in contact with the side of the one end of the substrate so as to cover the side of the one end, a potential of the main base portion via the main extension portion and a potential of the auxiliary base portion via the auxiliary extension portion, respectively, and determines whether or not the ion selective film is peeled from the main base portion based on a potential difference between an obtained potential of the main base portion and an obtained potential of the auxiliary base portion.

The "electrolyte" broadly means a solution containing at least one ion species.

"A pair of main surfaces" of the substrate means plate surfaces (for example, a front surface and a rear surface) that spatially expand and is not an end surface.

The "side of the one end" means a side close to the one end, of the one end and the other end, regarding the one direction. The "side of the other end" means a side close to the other end, of the one end and the other end, regarding the one direction.

The ion selective film having a "property of selectively allowing . . . ions to pass therethrough" means that the ion selective film has a property of allowing a specific ion species to pass therethrough, without allowing water to pass therethrough. For example, this property may be a property of selectively allowing sodium ions ($Na^+$) to pass therethrough, without allowing water to pass therethrough, or, a property of selectively allowing potassium ions ($K^+$) to pass through, without allowing water to pass therethrough, etc.

To bring the electrolyte into "contact" with the side of the one end of the substrate so as to cover the side of the one end, a user (typically, a subject) may sprinkle the electrolyte on the side of the one end of the substrate so as to cover the side of the one end, or may immerse the side of the one end of the substrate in the electrolyte.

The ion selective film "is peeled" from the main base portion means that the ion selective film is not in contact with the main base portion so as to cover the main base portion. This includes not only a state where the entire ion selective film is peeled from the main base portion but also a state where a part of the ion selective film is peeled from the main base portion. For example, in a case where there is no "peeling", the electrolyte does not directly contact with the main base portion, even when the electrolyte is brought into contact with the side of the one end of the substrate so as to cover the side of the one end. Whereas, in a case where there is a "peeling", the electrolyte directly contacts the main base portion, when the electrolyte is brought into contact with the side of the one end of the substrate so as to cover the side of the one end.

In another aspect, an electrolyte analysis method of the present disclosure is an electrolyte analysis method for measuring a concentration of ions contained in an electrolyte, the electrolyte analysis method preparing

- a substrate extending in one direction from one end to an other end,
- a main electrode layer including a main base portion and a main extension portion provided on one main surface of a pair of main surfaces of the substrate, the main base portion being provided in a specific region on a side of the one end in the one direction, the main extension portion extending from the main base portion to a side of the other end,
- an ion selective film provided to be in contact with the main base portion so as to cover the main base portion in the specific region, the ion selective film having a property of selectively allowing the ions to pass through the ion selective film, and
- an auxiliary electrode layer including an auxiliary base portion and an auxiliary extension portion provided on the one main surface or an other main surface of the pair of main surfaces of the substrate, the auxiliary base portion being provided in an auxiliary region different from the specific region and on the side of the one end in the one direction, the auxiliary extension portion extending from the auxiliary base portion to the side of the other end, are included, wherein
- the auxiliary electrode layer is disposed in a state separated from the main electrode layer, and
- the electrolyte analysis method comprising:
  - obtaining, in a state where the electrolyte is in contact with the side of the one end of the substrate so as to cover the side of the one end, a potential of the main base portion via the main extension portion and a potential of the auxiliary base portion via the auxiliary extension portion, respectively; and
  - determining whether or not the ion selective film is peeled from the main base portion based on a potential difference between an obtained potential of the main base portion and an obtained potential of the auxiliary base portion.

DETAILED DESCRIPTION

Hereinafter, embodiments of the present invention will be described in detail with reference to the drawings.

(Schematic Configuration of Electrochemical Sensor)

Figure 1A:
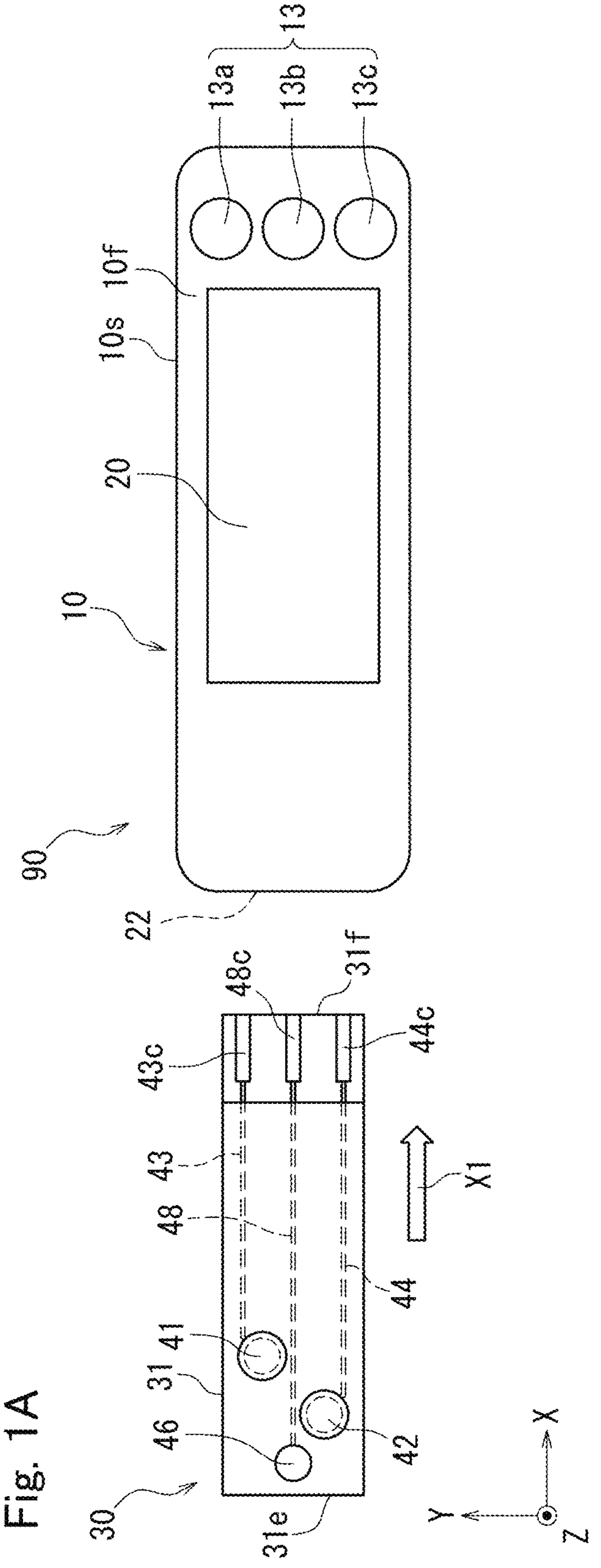
FIG. 1A is a view illustrating a schematic configuration of an electrochemical sensor as an electrolyte analysis device according to one embodiment of the present invention.

FIG. 1A illustrates a schematic configuration of an electrochemical sensor 90 as an electrolyte analysis device according to one embodiment of the present invention. For easy understanding, an XYZ orthogonal coordinate system is appropriately illustrated in FIG. 1A and also in FIGS. 1B, 2A, and 2B described later.

The electrochemical sensor 90 includes as major parts an electrolyte analysis test strip (hereinafter, simply referred to as "test strip") 30 and a main body 10 to which the test strip 30 is to be mounted. The test strip 30 is used to measure a concentration ratio between a first ion species and a second ion species contained in an electrolyte as a measurement target. In this example, the electrolyte as the measurement target is urine, the first ion species is sodium ions, and the second ion species is potassium ions. As an electrolyte for calibration, a standard solution containing sodium ions and potassium ions at a predetermined concentration ratio (that is, Na/K ratio) is used.

(Configuration of Test Strip)

Figure 2B:
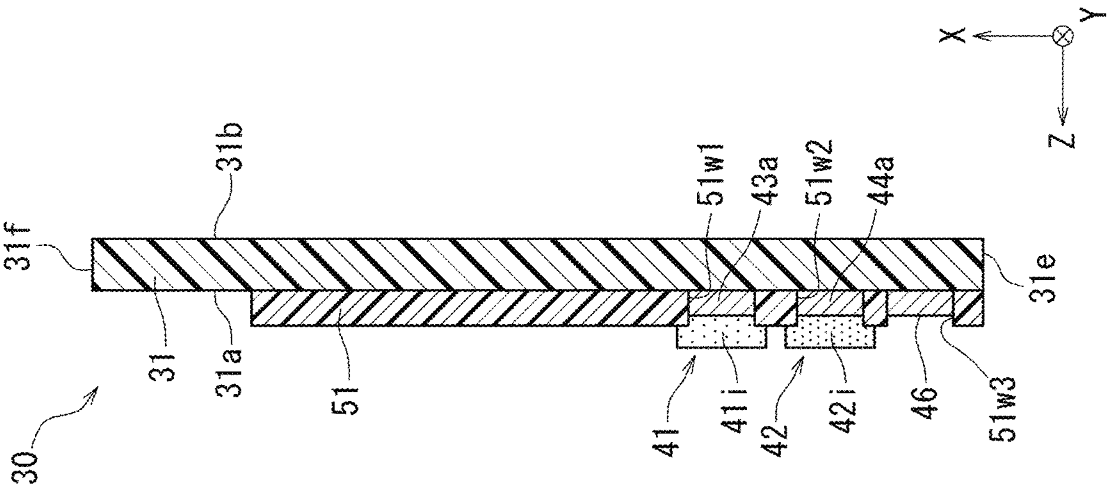
FIG. 2B is a view schematically illustrating a cross section of the electrolyte analysis test strip in FIG. 2A.
Figure 2A:
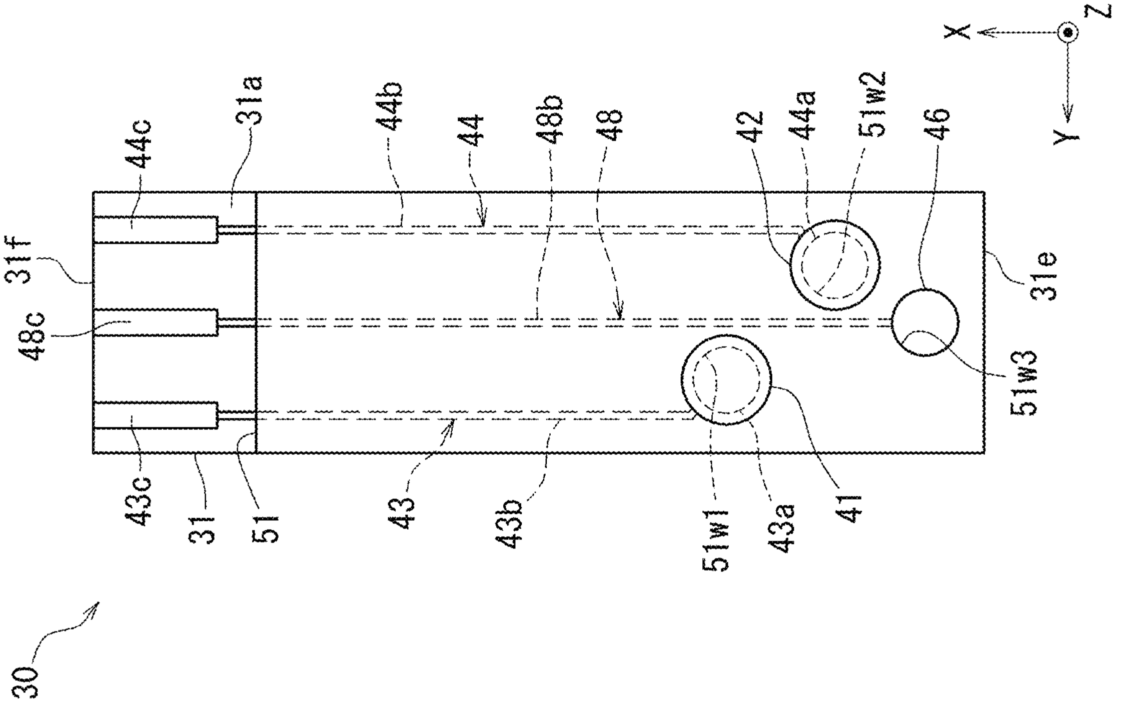
FIG. 2A is a view illustrating a planar layout of an electrolyte analysis test strip included in the electrochemical sensor.

FIG. 2A illustrates a planar layout of the test strip 30. FIG. 2B schematically illustrates a cross section in FIG. 2A, in particular, a cross section of an electrode portion. As can be understood from these drawings, the test strip 30 includes one elongated substrate 31 extending from one end 31*e* to an other end 31*f* in X direction, which is one direction, and includes on a front surface 31*a*, which is one main surface of the substrate 31, a sodium ion sensitive electrode 41 as a first ion sensitive electrode provided in a circular first specific region 51*w*1 on a side of the one end 31*e* in the X direction, a potassium ion sensitive electrode 42 as a second ion sensitive electrode provided in another circular second specific region 51*w*2 closer to the one end 31*e* than the first specific region 51*w*1, and a first and a second main electrode layers 43 and 44 respectively extending from the sodium ion sensitive electrode 41 and the potassium ion sensitive electrode 42 to a side of the other end 31*f*.

The "side of the one end 31*e*" means a side closer to the one end 31*e*, of the one end 31*e* and the other end 31*f*, regarding the X direction. The "side of the other end 31*f*" means a side closer to the other end 31*f*, of the one end 31*e* and the other end 31*f*, regarding the X direction.

The first main electrode layer 43 includes a circular base portion 43*a* as a first main base portion provided in the first specific region 51*w*1, an elongated lead portion 43*b* extending from the base portion 43*a* to the side of the other end 31*f*, and an electrode pad 43*c* provided on the side of the other end 31*f*, continuing from the lead portion 43*b*, and wider than the lead portion 43*b*. The lead portion 43*b* and the electrode pad 43*c* constitute a first main extension portion. The second main electrode layer 44 includes a circular base portion 44*a* as a second main base portion provided in the second specific region 51*w*2, an elongated lead portion 44*b* extending from the base portion 44*a* to the side of the other end 31*f*, and an electrode pad 44*c* provided on the side of the other end 31*f*, continuing from the lead portion 44*b*, and wider than the lead portion 44*b*. The lead portion 44*b* and the electrode pad 44*c* constitute a second main extension portion. The first main electrode layer 43 and the second main electrode layer 44 are separated from each other.

As can be understood from FIG. 2B, the sodium ion sensitive electrode 41 includes the base portion 43*a* of the first main electrode layer 43 and a sodium ion selective film 41*i* as a first ion selective film provided to be in contact with the base portion 43*a* so as to cover the base portion 43*a*. The potassium ion sensitive electrode 42 includes the base portion 44*a* of the second main electrode layer 44 and a potassium ion selective film 42*i* as a second ion selective film provided to be in contact with the base portion 44*a* so as to cover the base portion 44*a*. The sodium ion sensitive electrode 41 and the potassium ion sensitive electrode 42 come into contact with the electrolyte (in this example, urine) as the measurement target to respectively produce a first potential (referred to as $E_1$) corresponding to the concentration of sodium ions and a second potential (referred to as $E_2$) corresponding to the concentration of potassium ions.

Furthermore, as illustrated in FIG. 2A, the test strip 30 includes an auxiliary electrode layer 48 disposed on the front surface 31*a* of the substrate 31 in a state separated from the first and second main electrode layers 43 and 44. The auxiliary electrode layer 48 includes an auxiliary electrode 46 as an auxiliary base portion provided in a circular auxiliary region 51*w*3, an elongated lead portion 48*b* extending from the auxiliary electrode 46 to the side of the other end 31*f*, and an electrode pad 48*c* provided on the side of the other end 31*f*, continuing from the lead portion 48*b*, and wider than the lead portion 48*b*. In this example, the auxiliary electrode 46 is brought into contact with a standard solution (or urine) to produce a third potential (referred to as $E_3$).

In this example, the auxiliary region 51*w*3 is disposed on the front surface 31*a* of the substrate 31 at a place located between the one end 31*e* and the second specific region 51*w*2 in the X direction, and between the first specific region 51*w*1 and the second specific region 51*w*2 in the width direction (Y direction).

Correspondingly, on the front surface 31*a* of the substrate 31, the lead portions 43*b*, 48*b*, and 44*b* are arrayed from the +Y side to the −Y side in this order in a manner separated from each other. Correspondingly, along the other end 31*f* of the substrate 31, the electrode pads 43*c*, 48*c*, and 44*c* are arrayed in this order in a manner separated from each other.

An insulating film 51 as a protective layer is provided on the front surface 31*a* of the substrate 31. The insulating film 51 covers from the one end 31*e* to a portion substantially reaching the electrode pads 43*c*, 48*c*, and 44*c* in the X direction. Thus, each of the lead portions 43*b*, 48*b*, and 44*b* is protected by the insulating film 51. The electrode pads 43*c*, 48*c*, and 44*c* are exposed out of the insulating film 51, and are to be electrically connected to a connector of the main body described later.

On the front surface 31*a* of the substrate 31, the insulating film 51 has, in this example, three circular openings penetrating in a thickness direction (Z direction) to define the first specific region 51*w*1, the second specific region 51*w*2, and the auxiliary region 51*w*3 described above (the openings are respectively denoted by the same references of the regions 51*w*1, 51*w*2, and 51*w*3 defined by the openings themselves). Effective regions (functional regions) of the sodium ion sensitive electrode 41 and the potassium ion sensitive electrode 42 are defined by the sizes of the openings 51*w*1 and 51*w*2, respectively (in this example, about 4 mm in diameter for each). In this example, the size of the opening 51*w*3 is set to a diameter of about 4 mm.

The substrate 31 is made of an insulating material such as polyethylene terephthalate (PET), glass, silicon, a polyimide film, glass epoxy, polycarbonate, or acrylic. Thus, the front surface 31*a* (and a rear surface 31*b*) also has an insulating property. In this example, the size of the substrate 31 is set to about 60 to 100 mm in the X direction (longitudinal direction), about 15 to 30 mm in the Y direction (width direction), and about 200 μm in the Z direction (thickness direction).

The first main electrode layer 43, the second main electrode layer 44, and the auxiliary electrode layer 48 are made of the same conductive material such as Pt, Ag, Au, Ir, C, or $IrO_2$. Each of the first main electrode layer 43, the second main electrode layer 44, and the auxiliary electrode layer 48 has a thickness of about 10 m.

The insulating film 51 is made of a photocurable or thermosetting insulating resist, or a seal, a sheet, a tape, or the like having an insulating property. The thickness of the insulating film 51 is about 30 m to 100 μm.

In this example, a solution obtained by dissolving Bis (12-corwn-4), polyvinyl chloride (PVC), 2-nitrophenyloctyl ether (NPOE), and potassium tetrakis (4-chlorophenyl) borate (K-TCPB) in tetrahydrofuran (TIF) is used as a material liquid for forming the sodium ion selective film 41*i*. In this example, a solution obtained by dissolving Bis (benzo-15-crown-5), PVC, NPOE, and K-TCPB in THE is used as a material liquid for forming the potassium ion selective film 42*i*. These material liquids are dried and cured at a manufacturing stage.

The manufacturing process of the test strip 30 is as follows, for example. First, the first main electrode layer 43, the second main electrode layer 44, and the auxiliary electrode layer 48 are simultaneously formed on the front surface 31*a* of the substrate 31 by, for example, a screen printing method. Next, on the front surface 31*a* having these electrodes, the insulating film 51 is formed thereon by, for example, a screen printing method. Here, the insulating film 51 is formed in a state to make the electrode pads 43*c*, 48*c*, and 44*c* are left exposed, and to have the three openings 51*w*1, 51*w*2, and 51*w*3 respectively through which the base portion 43*a* of the first main electrode layer 43, the base portion 44*a* of the second main electrode layer 44, and the auxiliary electrode 46 are exposed. Next, a material liquid for forming the sodium ion selective film 41*i* is applied to the opening 51*w*1 on the front surface 31*a* of the substrate 31 by, for example, an inkjet printing method. Then, the applied material liquid is dried and cured to form the sodium ion selective film 41*i* in a region corresponding to the opening 51*w*1. The base portion 43*a* and the sodium ion selective film 41*i* constitute the sodium ion sensitive electrode 41. Next, a material liquid for forming the potassium ion selective film 42*i* is applied to the opening 51*w*2 on the front surface 31*a* of the substrate 31 by, for example, an inkjet printing method. Then, the applied material liquid is dried and cured to form the potassium ion selective film 42*i* in a region corresponding to the opening 51*w*2. The base portion 44*a* and the potassium ion selective film 42*i* constitute the potassium ion sensitive electrode 42. The formed (cured) sodium ion selective film 41*i* and potassium ion selective film 42*i* are transparent.

(Configuration of Main Body)

Figure 1B:
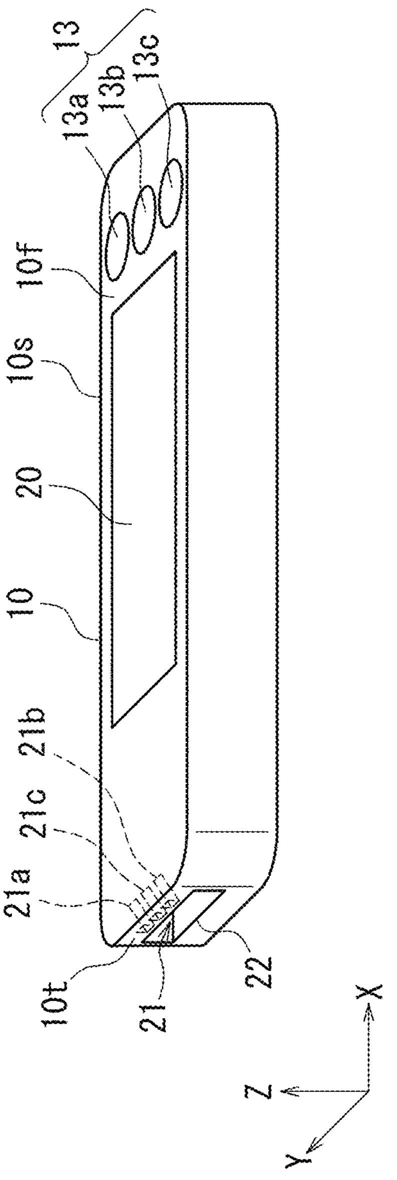
FIG. 1B is a view schematically illustrating a main body of the electrolyte analysis device as viewed obliquely.

FIG. 1B schematically illustrates the main body 10 of the electrochemical sensor 90 as viewed obliquely. The main body 10 has, in this example, an elongated prismatic shape to be gripped by a hand of a user. The electrochemical sensor 90 is configured as a hand-held type device which is used by a user with holding the main body 10 in his/her hand.

The main body 10 includes a housing 10*s* forming a substantially prismatic outer peripheral wall, a display unit 20 as a display screen provided substantially at the center of a front face (surface on the +Z side) 10*f* of the housing 10*s*, an operation unit 13 provided at a place further on the +X side than the display unit 20 on the front face 10*f*, and a connector 21 provided on an end surface 10*t* on the −X side of the housing 10*s*. In this example, the display unit 20 includes a liquid crystal display (LCD), and displays various kinds of information such as a calculation result given by a control unit 11 (see FIG. 3) to be described later. In this example, the operation unit 13 includes three push-button switches, that is, a power switch 13*a* for turning on and off a power of the electrochemical sensor 90, a calibration switch 13*b* for inputting an instruction to start a calibration with an electrolyte (standard solution) having a known concentration ratio between sodium ions and potassium ions, and a measurement switch 13*c* for inputting an instruction to start a calculation of a concentration ratio between sodium ions and potassium ions in urine as a measurement target solution.

The connector 21 has a slot 22 that opens toward the −X side to detachably receive the test strip 30. In the slot 22, three contact electrodes 21*a*, 21*c*, and 21*b* made of leaf springs bent in an L shape are provided at places respectively corresponding to the electrode pads 43*c*, 48*c*, and 44*c* of the test strip 30. The contact electrodes are appropriately referred to as a first contact electrode 21*a*, a third contact electrode 21*c*, and a second contact electrode 21*b*. As illustrated in FIG. 1A, when the user inserts the other end 31*f* of the test strip 30 in the slot 22 in the direction indicated by an arrow X1, the electrode pads 43*c*, 48*c*, and 44*c* come into contact with and are electrically connected to the contact electrodes 21*a*, 21*c*, and 21*b*, respectively. As a result, a first potential $E_1$ produced by the sodium ion sensitive electrode 41 of the test strip 30 and a second potential $E_2$ produced by the potassium ion sensitive electrode 42 of the test strip 30 are transmitted to the first and second contact electrodes 21*a* and 21*b* via the first and second main electrode layers 43 and 44, respectively, and can be input to the main body 10. The third potential $E_3$ produced by the auxiliary electrode 46 is transmitted to the third contact electrode 21*c* via the auxiliary electrode layer 48 (in particular, the lead portion 48*b* and the electrode pad 48*c*), and can be input to the main body 10.

Figure 3:
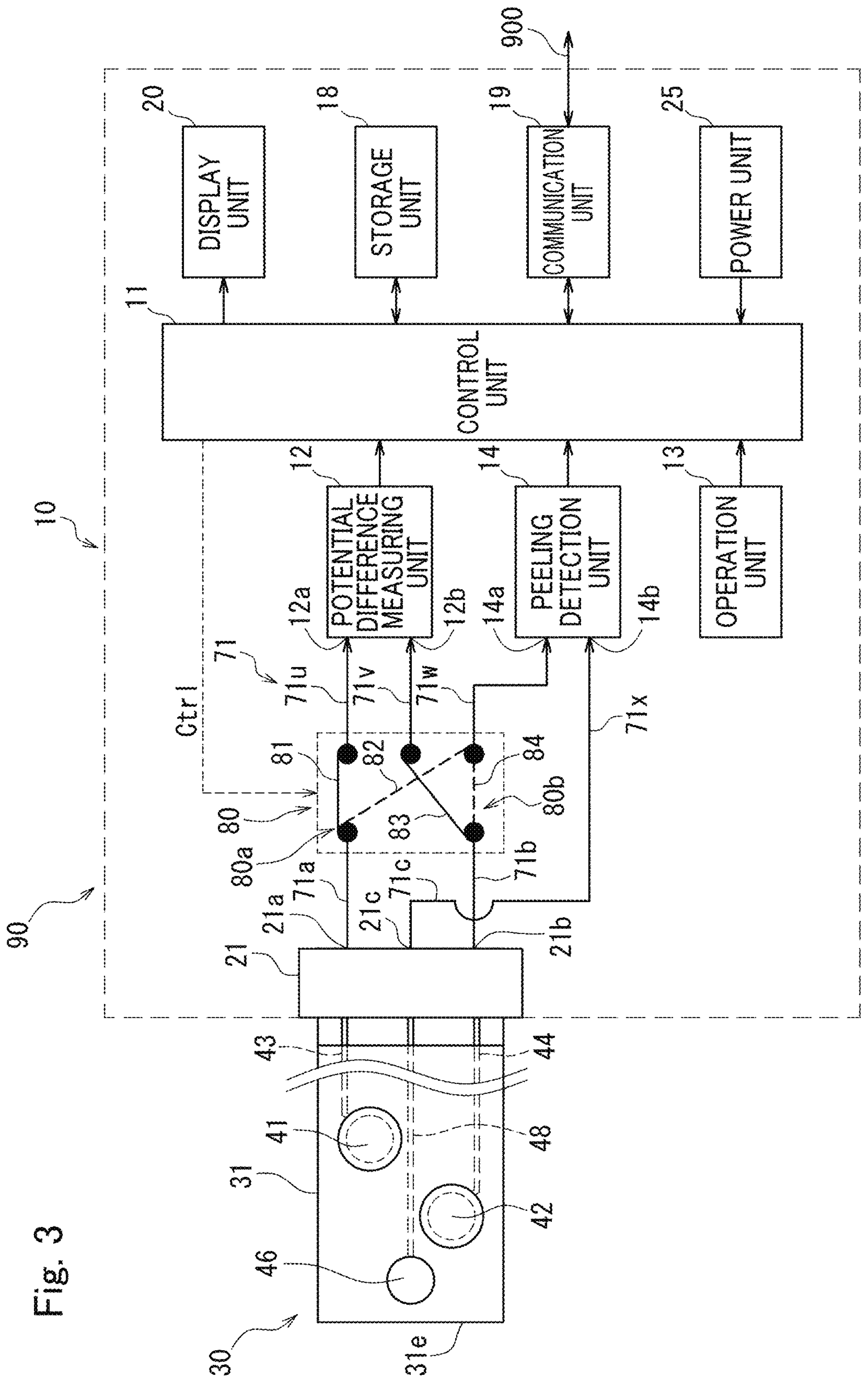
FIG. 3 is a diagram illustrating a block configuration of the electrochemical sensor.

As illustrated in FIG. 3, in addition to the display unit 20, the operation unit 13, and the connector 21 described above, the control unit 11, a potential difference measuring unit 12, a peeling detection unit 14, a storage unit 18, a communication unit 19, and a power unit 25 are mounted and housed in the main body 10. The control unit 11 includes a micro controller unit (MCU) including a central processing unit (CPU) operated by software, and controls the entire operation of the electrochemical sensor 90 as described later. The potential difference measuring unit 12 has two input parts 12*a* and 12*b*, amplifies a potential difference between the input parts 12*a* and 12*b*, and inputs an amplified potential difference to the control unit 11. Similarly, the peeling detection unit 14 has two input parts 14*a* and 14*b*, amplifies a potential difference between the input parts 14*a* and 14*b*, and inputs an amplified potential difference to the control unit 11. The storage unit 18 includes a semiconductor memory, and stores data for a program for controlling the electrochemical sensor 90, setting data for setting various functions of the electrochemical sensor 90, data of measurement value, and the like. The storage unit 18 is used as a work memory or the like when a program is executed. The communication unit 19 transmits information (in this example, measured value data) from the control unit 11 to another device (for example, a server) via a network 900. Information from another device is received via the network 900 and transferred to the control unit 11. The power unit 25 supplies an electrical power to the control unit 11, the display unit 20, the potential difference measuring unit 12, the peeling detection unit 14, the storage unit 18, the communication unit 19, and other units in the main body 10.

Furthermore, a wiring group 71 for connecting the three contact electrodes 21*a*, 21*c*, and 21*b* of the connector 21 to the potential difference measuring unit 12 and the peeling detection unit 14, and a changeover switch 80 interposed in the wiring group 71 are mounted and housed in the main body 10. The wiring group 71 includes wirings 71*a*, 71*c*, and 71*b* electrically connected to the three contact electrodes 21*a*, 21*c*, and 21*b* of the connector 21, respectively, and wirings 71*u*, 71*v*, 71*w*, and 71*x* electrically connected to the input parts 12*a* and 12*b* of the potential difference measuring unit 12 and the input parts 14*a* and 14*b* of the peeling detection unit 14, respectively. Note that, the wiring 71*c* and the wiring 71*x* are made of one wiring in common.

In this example, the changeover switch 80 includes two switching units 80*a* and 80*b* that are switched independently by a switching control signal Ctrl from the control unit 11. In this example, the switching unit 80*a* can be switched between a normal position (indicated by a solid line) where a conduction path 81 is formed between the wiring 71*a* and the wiring 71*u* and an active position (indicated by a broken line) where the conduction path 82 is formed between the wiring 71*a* and the wiring 71*w*. The switching unit 80*b* can be switched between a normal position (indicated by a solid line) where a conduction path 83 is formed between the wiring 71*b* and the wiring 71*v* and an active position (indicated by a broken line) where the conduction path 84 is formed between the wiring 71*b* and the wiring 71*w*. In this example, a first connection state in which the switching unit 80*a* is in the active position and the switching unit 80*b* is in the normal position, a second connection state in which the switching unit 80*a* is in the normal position and the switching unit 80*b* is in the active position, and a third connection state in which both of the two switching units 80*a* and 80*b* are in the normal position are to be formed. In this electrochemical sensor 90, a connection state in which both of the two switching units 80*a* and 80*b* are in the active position is not to be formed.

(First Connection State)

In the first connection state in which the switching unit 80*a* is in the active position and the switching unit 80*b* is in the normal position, the contact electrode 21*a* of the connector 21 is electrically connected to the input part 14*a* of the peeling detection unit 14 via the wiring 71*a*, the conduction path 82, and the wiring 71*w*. The contact electrode 21*c* of the connector 21 is electrically connected to the input part 14*b* of the peeling detection unit 14 via the wiring 71*c* (that is, the wiring 71*x*). Thus, the peeling detection unit 14 can receive the first potential $E_1$ produced by the sodium ion sensitive electrode 41 by the input part 14*a* and the third potential $E_3$ produced by the auxiliary electrode 46 by the input part 14*b*, amplify a potential difference (referred to as $\Delta E_{13}$) between the first potential $E_1$ and the third potential $E_3$, and input such an amplified potential difference to the control unit 11. Thus, as described later, the control unit 11 serves as a peeling determination unit, and can determine whether or not the sodium ion selective film 41*i* forming the sodium ion sensitive electrode 41 is peeled from the base portion 43*a* based on the potential difference $\Delta E_{13}$.

(Second Connection State)

In the second connection state in which the switching unit 80*a* is in the normal position and the switching unit 80*b* is in the active position, the contact electrode 21*b* of the connector 21 is electrically connected to the input part 14*a* of the peeling detection unit 14 via the wiring 71*b*, the conduction path 84, and the wiring 71*w*. The contact electrode 21*c* of the connector 21 is electrically connected to the input part 14*b* of the peeling detection unit 14 via the wiring 71*c* (that is, the wiring 71*x*). Thus, the peeling detection unit 14 can receive the second potential $E_2$ produced by the potassium ion sensitive electrode 42 by the input part 14*a* and the third potential $E_3$ produced by the auxiliary electrode 46 by the input part 14*b*, amplify a potential difference (referred to as $\Delta E_{23}$) between the second potential $E_2$ and the third potential $E_3$, and input such an amplified potential difference to the control unit 11. Thus, as described later, the control unit 11 serves as a peeling determination unit, and can determine whether or not the potassium ion selective film 42*i* forming the potassium ion sensitive electrode 42 is peeled from the base portion 44*a* based on the potential difference $\Delta E_{23}$.

Here, the way in which the control unit 11 determines whether or not there is any peeling of the sodium ion selective film 41*i* (referred to as “Na film peeling”) and whether or not there is any peeling of the potassium ion selective film 42*i* (referred to as “K film peeling”) is based on following phenomena observed by the inventor through an experiment.

Figure 5A:
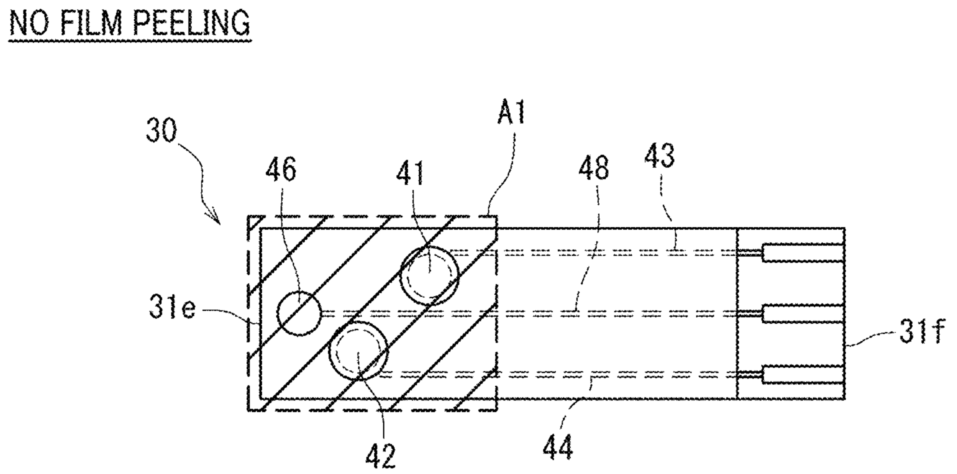
FIG. 5A is a view illustrating a state where a standard solution is brought into contact with the electrolyte analysis test strip having no film peeling so as to cover a side of one end of the test strip.
Figure 5B:
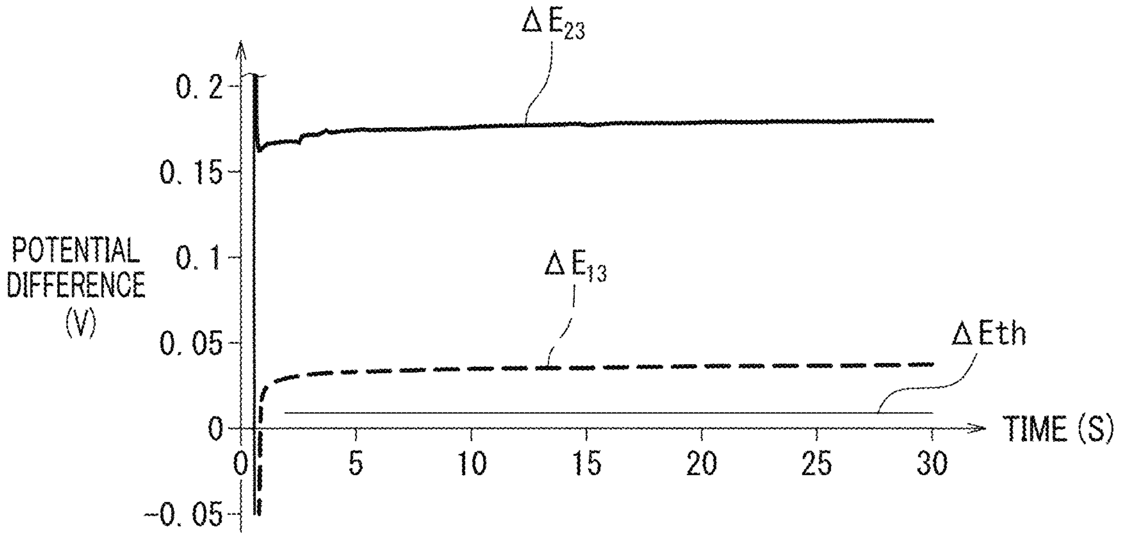
FIG. 5B is a chart illustrating a change in potential difference between a sodium ion sensitive electrode and an auxiliary electrode and a change in potential difference between a potassium ion sensitive electrode and the auxiliary electrode in the state illustrated in FIG. 5A.

For example, as illustrated in FIG. 5A, it is assumed that the test strip 30 has no film peeling. In this state, the standard solution as an electrolyte, in this example, is brought into contact with the side of the one end 31*e* of the substrate 31 so as to cover the side of the one end 31*e*, more specifically, so as to integrally cover a region A1 (indicated by broken lines in FIG. 5A) including at least the auxiliary electrode 46, the sodium ion sensitive electrode 41, and the potassium ion sensitive electrode 42. The standard solution has a known concentration ratio Mr (hereinafter in this example, Mr=4.0) between the concentration of sodium ions and the concentration of potassium ions. Then, as illustrated in FIG. 5B, there occurs a phenomenon that the potential difference $\Delta E_{13}$ between the first potential $E_1$ produced by the sodium ion sensitive electrode 41 and the third potential $E_3$ produced by the auxiliary electrode 46 (indicated by a broken line in FIG. 5B, the same applies to FIG. 6B and FIG. 7B) converges to a value (in this example, about 0.03 (V)) corresponding to the concentration of sodium ions in the standard solution after few seconds (four to five seconds) from a start of contact. The potential difference $\Delta E_{23}$ between the second potential $E_2$ produced by the potassium ion sensitive electrode 42 and the third potential $E_3$ produced by the auxiliary electrode 46 (indicated by a solid line in FIG. 5B, the same applies to FIG. 6B and FIG. 7B) converges to a value (in this example, about 0.18 (V)) corresponding to the concentration of potassium ions of the standard solution after few seconds (four to five seconds) from the start of contact. Note that, a noise level is assumed to be sufficiently smaller than 0.01 (V) (the same applies hereinafter).

Figure 6A:
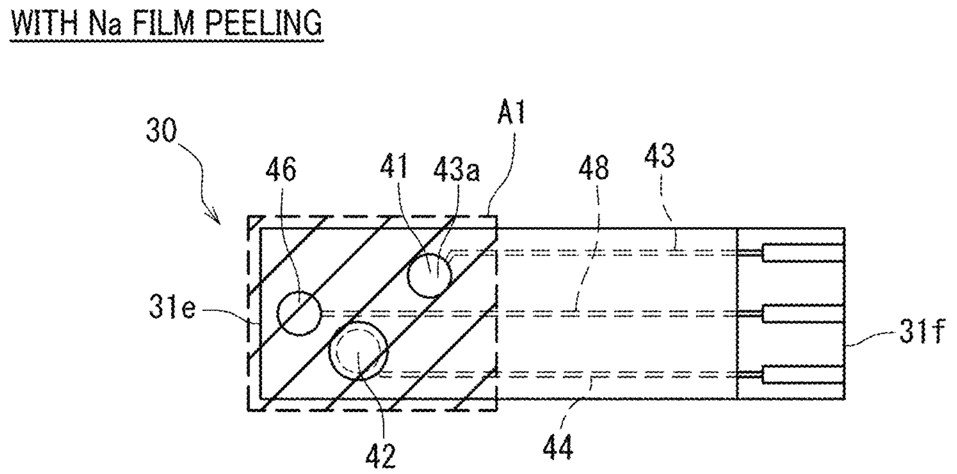
FIG. 6A is a view illustrating a state where the standard solution is brought into contact with the electrolyte analysis test strip having an Na film peeling but no K film peeling so as to cover the side of the one end of the test strip.
Figure 6B:
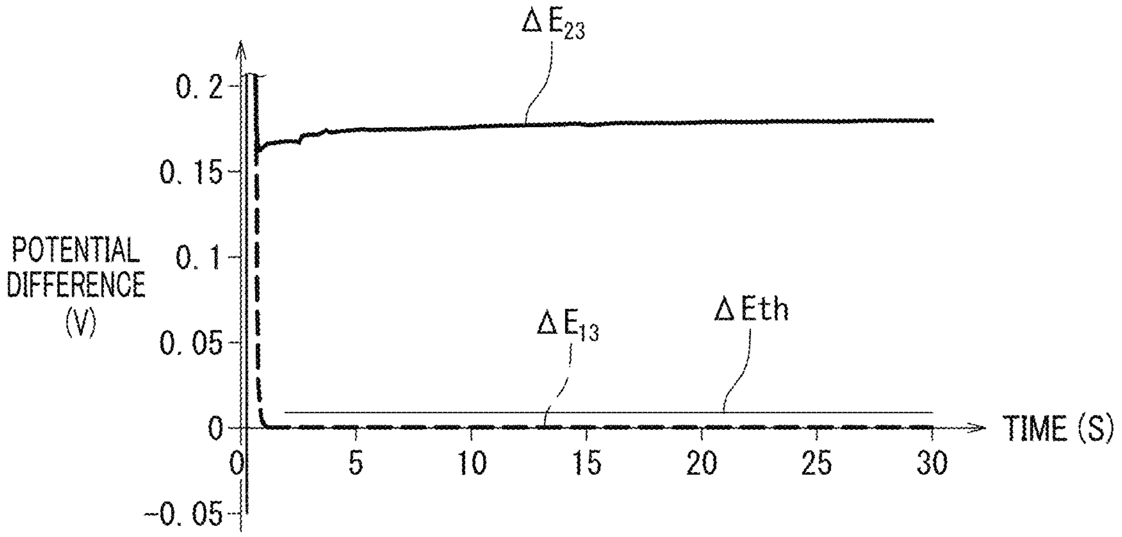
FIG. 6B is a chart illustrating a change in potential difference between the sodium ion sensitive electrode and the auxiliary electrode and a change in potential difference between the potassium ion sensitive electrode and the auxiliary electrode in the state illustrated in FIG. 6A.

Alternatively, for example, as illustrated in FIG. 6A, it is assumed that the test strip 30 has an Na film peeling but no K film peeling. Thus, the base portion 43*a* of the sodium ion sensitive electrode 41 is exposed. In this state, the standard solution as an electrolyte is brought into contact with the side of the one end 31*e* of the substrate 31 so as to cover the side of the one end 31*e* (a region A1 indicated by broken lines in FIG. 6A). Then, as illustrated in FIG. 6B, there occurs a phenomenon that the potential difference $\Delta E_{13}$ between the first potential $E_1$ produced by the sodium ion sensitive electrode 41 and the third potential $E_3$ produced by the auxiliary electrode 46 becomes substantially zero (<0.01 (V)) in about two seconds after the start of contact. This is because the sodium ion sensitive electrode 41 and the auxiliary electrode 46 are electrically conductive to each other by the standard solution, and the first main electrode layer 43 (including the base portion 43*a*) and the auxiliary electrode layer 48 (including the auxiliary electrode 46) are made of the same conductive material as described above. Note that, this phenomenon occurs in a similar manner not only when the entire sodium ion selective film 41*i* is peeled from the base portion 43*a* but also when a part of the sodium ion selective film 41*i* is peeled from the base portion 43*a*. Similar to that described in FIG. 5B, the potential difference $\Delta E_{23}$ between the second potential $E_2$ produced by the potassium ion sensitive electrode 42 and the third potential $E_3$ produced by the auxiliary electrode 46 converges to a value (in this example, about 0.18 (V)) corresponding to the concentration of potassium ions in the standard solution after several seconds (four seconds to five seconds) from the start of contact.

Figure 7A:
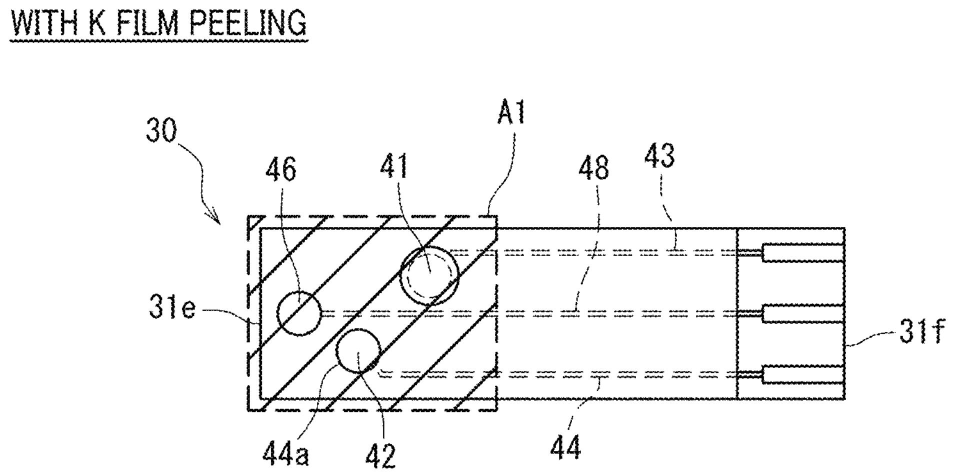
FIG. 7A is a view illustrating a state where the standard solution is brought into contact with the electrolyte analysis test strip having a K film peeling but no Na film peeling so as to cover the side of the one end of the test strip.
Figure 7B:
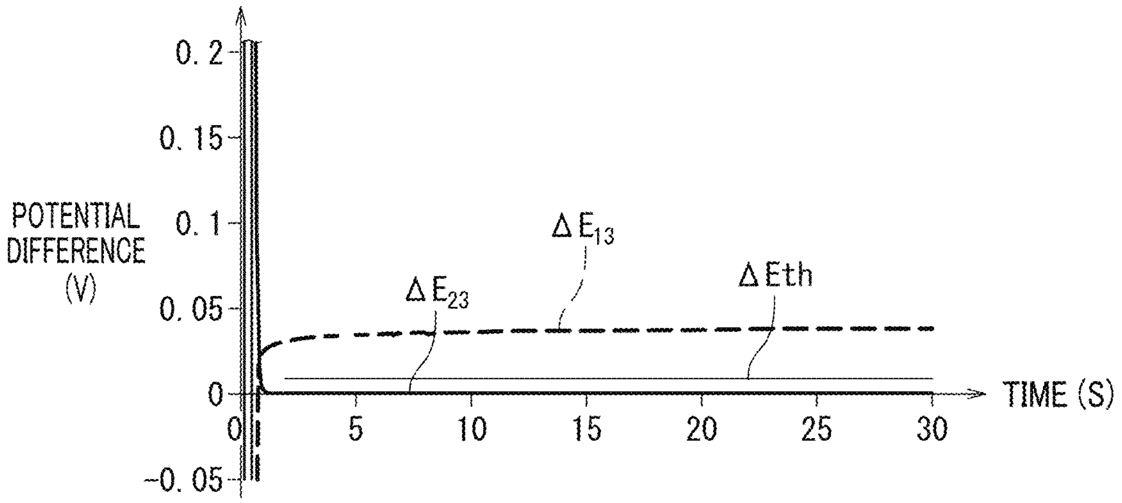
FIG. 7B is a chart illustrating a change in potential difference between the sodium ion sensitive electrode and the auxiliary electrode and a change in potential difference between the potassium ion sensitive electrode and the auxiliary electrode in the state illustrated in FIG. 7A.

In addition, for example, as illustrated in FIG. 7A, it is assumed that the test strip 30 has a K film peeling but no Na film peeling. Thus, the base portion 44*a* of the potassium ion sensitive electrode 42 is exposed. In this state, the standard solution as an electrolyte is brought into contact with the side of the one end 31*e* of the substrate 31 so as to cover the side of the one end 31*e* (a region A1 indicated by broken lines in FIG. 7A). Then, as illustrated in FIG. 7B, there occurs a phenomenon that the potential difference $\Delta E_{23}$ between the second potential $E_2$ produced by the potassium ion sensitive electrode 42 and the third potential $E_3$ produced by the auxiliary electrode 46 becomes substantially zero (<0.01 (V)) in about two seconds after the time of contact. This is because the potassium ion sensitive electrode 42 and the auxiliary electrode 46 are electrically conductive to each other by the standard solution, and the second main electrode layer 44 (including the base portion 44*a*) and the auxiliary electrode layer 48 (including the auxiliary electrode 46) are made of the same conductive material as described above. Note that, this phenomenon occurs in a similar manner not only when the entire potassium ion selective film 42*i* is peeled from the base portion 44*a* but also when a part of the potassium ion selective film 42*i* is peeled from the base portion 44*a*. Similar to that described in FIG. 5B, the potential difference $\Delta E_{13}$ between the first potential $E_1$ produced by the sodium ion sensitive electrode 41 and the third potential $E_3$ produced by the auxiliary electrode 46 converges to a value (in this example, about 0.03 (V)) corresponding to the concentration of sodium ions in the standard solution after several seconds (four seconds to five seconds) from the star of contact.

When the test strip 30 has both Na film peeling and K film peeling, both the potential difference $\Delta E_{13}$ and the potential difference $\Delta E_{23}$ become substantially zero (<0.01 (V)) in about two seconds from the start of contact.

The potential differences $\Delta E_{13}$ and $\Delta E_{23}$ in these cases described above are summarized in Table 1 below.

TABLE 1

| | Potential difference (after five seconds from the start of contact with the standard solution) | |
|---|---|---|
| | $\Delta E_{13}$ | $\Delta E_{23}$ |
| With no film peeling | ≈0.03(V) | ≈0.18(V) |
| With Na film peeling but no K film peeling | <0.01(V) | ≈0.18(V) |
| With K film peeling but no Na film peeling | ≈0.03(V) | <0.01(V) |
| With both Na film peeling and K film peeling | <0.01(V) | <0.01(V) |

Thus, the control unit 11 serves as a peeling determination unit, and can determine whether or not the sodium ion selective film 41*i* is peeled from the base portion 43*a* based on, for example, whether or not the potential difference $\Delta E_{13}$ after five seconds from the start of contact with the standard solution is below a predetermined threshold value ΔEth (in this example, ΔEth=0.01 (V)). Similarly, whether or not the potassium ion selective film 42*i* is peeled from the base portion 44*a* can be determined based on whether or not the potential difference $\Delta E_{23}$ after five seconds from the start of contact with the standard solution is below the threshold value ΔEth (=0.01 (V)). In this manner, since the control unit 11 determines based on whether or not the potential differences $\Delta E_{13}$ and $\Delta E_{23}$ are each below the threshold value ΔEth, the above determination can be made by simple processing. In addition, when there are Na film peeling and K film peeling, the potential differences $\Delta E_{13}$ and $\Delta E_{23}$ both become substantially zero, so that the presence or absence of Na film peeling and the presence or absence of K film peeling can be determined accurately.

(Third Connection State)

In the third connection state in which the switching units 80*a* and 80*b* of the changeover switch 80 illustrated in FIG. 3 are both in the normal position, the contact electrode 21*a* of the connector 21 is electrically connected to the input part 12*a* of the potential difference measuring unit 12 via the wiring 71*a*, the conduction path 81, and the wiring 71*u*. At the same time, the contact electrode 21*b* of the connector 21 is electrically connected to the input part 12*b* of the potential difference measuring unit 12 via the wiring 71*b*, the conduction path 83, and the wiring 71*v*. Thus, the potential difference measuring unit 12 can receive the first potential $E_1$ produced by the sodium ion sensitive electrode 41 by the input part 12*a* and the second potential $E_2$ produced by the potassium ion sensitive electrode 42 by the input part 12*b*, and amplify a potential difference (referred to as ΔE) between the first potential $E_1$ and the second potential $E_2$.

The control unit 11 serves as a second calculation unit to calculate a concentration ratio $(C_1/C_2)$ between a concentration $C_1$ of sodium ions and a concentration $C_2$ of potassium ions contained in the electrolyte (in this example, urine), which is the measurement target, using the potential difference ΔE amplified by the potential difference measuring unit 12.

In the electrochemical sensor 90, the concentration ratio $(C_1/C_2)$ between the concentration $C_1$ of sodium ions and the concentration $C_2$ of potassium ions contained in the measurement target solution is obtained as described below. It is here assumed that sensitivity $S_1$ and selectivity $k_1$ of the sodium ion sensitive electrode 41 are respectively almost equal to sensitivity $S_2$ and selectivity $k_2$ of the potassium ion sensitive electrode 42. That is, $S_1-S_2\approx 0$ and $k_1-k_2\approx 0$. In this case, as disclosed in Patent Document 1 (JP 6127460 B2), the potential difference ΔE between the sodium ion sensitive electrode 41 and the potassium ion sensitive electrode 42 is simply expressed by the following equation (Eq. 1).

$$\Delta E = E_1{}^0 - E_2{}^0 + S_1 \log(C_1/C_2) \quad \text{(Eq. 1)}$$

Here, $E_1{}^0-E_2{}^0$ is a constant and is assumed to be obtained in advance. When the sensitivity $S_1$ as a parameter is obtained by measuring a ΔE for an electrolyte (standard solution) having a known concentration ratio Mr between sodium ions and potassium ions, and further a potential difference ΔE is measured for an electrolyte as a measurement target (in this example, urine), then a concentration ratio Ms $(=C_1/C_2)$ between sodium ions and potassium ions in the electrolyte as the measurement target can be calculated based on the equation (Eq. 1).

(Electrolyte Analysis Method)

Figure 4:
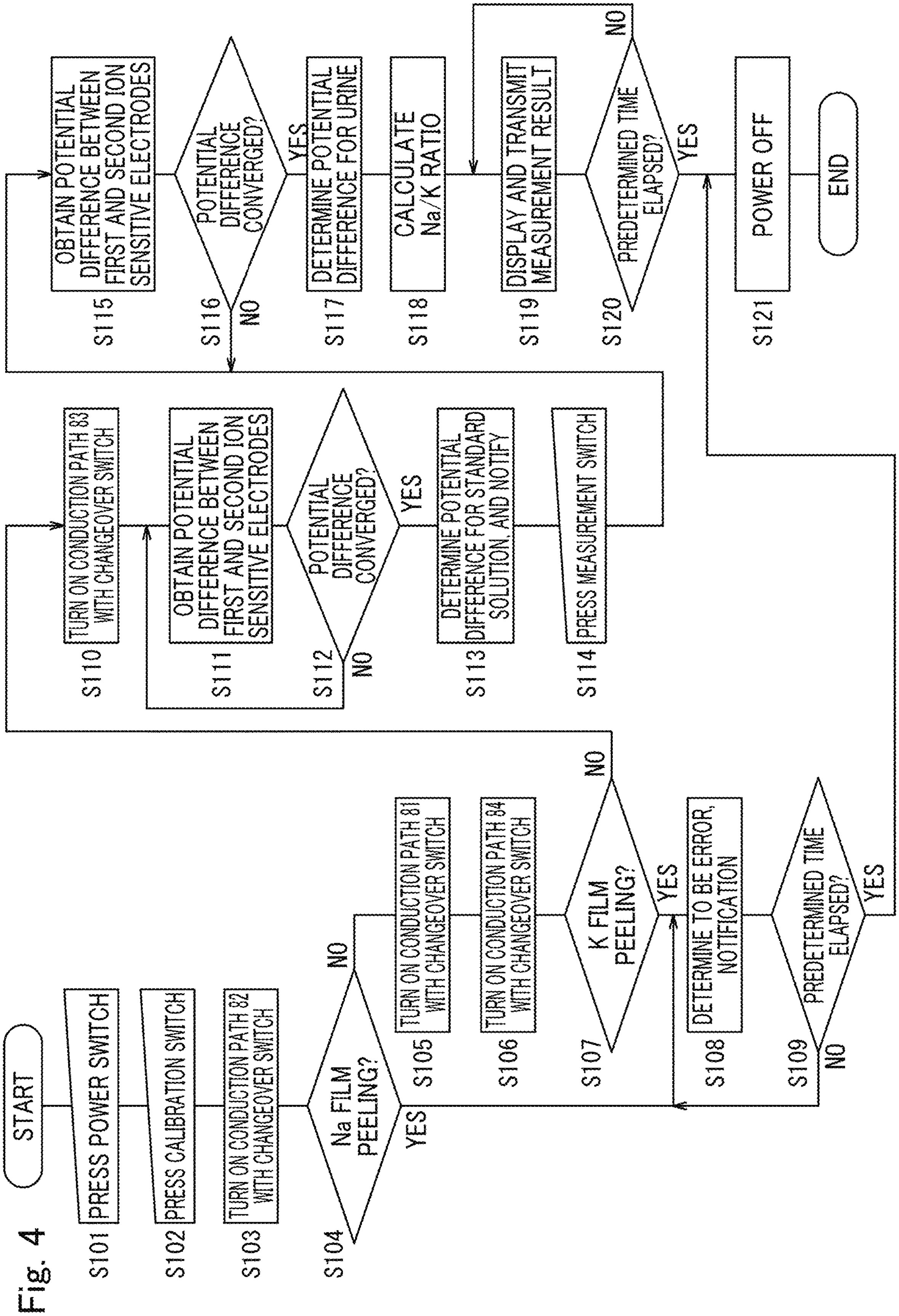
FIG. 4 is a diagram illustrating a flow of an electrolyte analysis method in which a subject as a user measures a concentration ratio between sodium ions and potassium ions in urine as an electrolyte using the electrochemical sensor.

FIG. 4 illustrates a flow of an electrolyte analysis method in which a subject as a user measures a concentration ratio between sodium ions and potassium ions in urine as an electrolyte using the electrochemical sensor 90.

As illustrated in FIG. 1, the user inserts the other end 31*f* of the test strip 30 in the slot 22 of the main body 10 as indicated by an arrow X1 to mount the test strip 30 in the main body 10 in advance. This state is referred to as a "mounted state". As described above, in the mounted state, the electrode pads 43*c*, 48*c*, and 44*c* of the test strip 30 are in contact with and are electrically connected to the contact electrodes 21*a*, 21*c*, and 21*b* of the connector 21, respectively.

Next, in this mounted state, the user presses the power switch 13*a* of the main body 10 to turn on (step S101 in FIG. 4). Then, the power unit 25 illustrated in FIG. 3 starts power supply to the units in the main body 10. In this example, the control unit 11 causes the display unit 20 to display a character string "ON" indicating that the power is turned on. At the same time, the control unit 11 maintains both the switching units 80*a* and 80*b* of the changeover switch 80 in the normal position by the switching control signal Ctrl. As a result, in the changeover switch 80, the conduction paths 81 and 83 are set (created) to ON states, respectively.

Next, the standard solution as an electrolyte is brought into contact with the side of the one end 31*e* of the test strip 30 (substrate 31) so as to cover the side of the one end 31*e* (for example, the region A1 indicated by broken lines in FIG. 5). In this example, since all of the sodium ion sensitive electrode 41, the potassium ion sensitive electrode 42, and the auxiliary electrode 46 are provided on the front surface 31*a* of the substrate 31, the user only needs to bring the standard solution into contact with the front surface 31*a* of the substrate 31 so as to cover the region A1 (this allows performing the subsequent processing). The operation of bringing the standard solution into contact so as to cover the region A1 may be performed by, for example, sprinkling the standard solution on the side of the one end 31*e* of the test strip 30, or immersing the side of the one end 31*e* of the test strip 30 in the standard solution contained in a container (not illustrated). The user then presses the calibration switch 13*b* to turn on (step S102 in FIG. 4).

Then, the control unit 11 serves as a switching control unit to control the changeover switch 80 illustrated in FIG. 3 by the switching control signal Ctrl to switch the switching unit 80*a* to the active position and maintain the switching unit 80*b* in the normal position. As a result, the conduction path 82 instead of the conduction path 81 is turned on, and the conduction path 83 is maintained in the ON state to create the first connection state (step S103 in FIG. 4). In the first connection state, the contact electrode 21*a* of the connector 21 is electrically connected to the input part 14*a* of the peeling detection unit 14 via the wiring 71*a*, the conduction path 82, and the wiring 71*w*. The contact electrode 21*c* of the connector 21 is electrically connected to the input part 14*b* of the peeling detection unit 14 via the wiring 71*c* (that is, the wiring 71*x*). Thus, the peeling detection unit 14 receives the first potential $E_1$ produced by the sodium ion sensitive electrode 41 by the input part 14*a* and the third potential $E_3$ produced by the auxiliary electrode 46 by the input part 14*b*, amplifies a potential difference $\Delta E_{13}$ between the first potential $E_1$ and the third potential $E_3$, and inputs such an amplified potential difference $\Delta E_{13}$ to the control unit 11. The control unit 11 waits until five seconds elapses after the calibration switch 13*b* is turned on for the potential difference $\Delta E_{13}$ (and $\Delta E_{23}$ described later) to converge.

Subsequently, the control unit 11 serves as a peeling determination unit to determine, based on the potential difference $\Delta E_{13}$, whether or not the sodium ion selective film 41*i* forming the sodium ion sensitive electrode 41 is peeled from the base portion 43*a*, that is, whether or not there is any Na film peeling (step S104 in FIG. 4). Specifically, as illustrated in FIG. 6B, when the potential difference $\Delta E_{13}$ after five seconds from the start of contact with the standard solution is below the threshold value ΔEth (=0.01 (V)), the control unit 11 determines that the sodium ion selective film 41*i* is peeled from the base portion 43*a* (there is an Na film peeling) (YES in step S104 in FIG. 4). In this case, the process proceeds to step S108 described later. As illustrated in FIG. 5B, when the potential difference $\Delta E_{13}$ after five seconds from the start of contact with the standard solution is equal to or higher than the threshold value ΔEth (=0.01 (V)), the control unit 11 determines that the sodium ion selective film 41*i* is not peeled from the base portion 43*a* (no Na film peeling) (NO in step S104 in FIG. 4).

Subsequently, the control unit 11 serves as a switching control unit to control the changeover switch 80 illustrated in FIG. 3 by the switching control signal Ctrl to switch the switching unit 80*a* from the active position to the normal position and the switching unit 80*b* from the normal position to the active position. As a result, the conduction path 81 instead of the conduction path 82 is turned on (step S105 in FIG. 4) and the conduction path 84 instead of the conduction path 83 is turned on (step S106 in FIG. 4) to create the second connection state. In the second connection state, the contact electrode 21*b* of the connector 21 is electrically connected to the input part 14*a* of the peeling detection unit 14 via the wiring 71*b*, the conduction path 84, and the wiring 71*w*. The contact electrode 21*c* of the connector 21 is electrically connected to the input part 14*b* of the peeling detection unit 14 via the wiring 71*c* (that is, the wiring 71*x*). Thus, the peeling detection unit 14 receives the second potential $E_2$ produced by the potassium ion sensitive electrode 42 by the input part 14*a* and the third potential $E_3$ produced by the auxiliary electrode 46 by the input part 14*b*, amplifies a potential difference $\Delta E_{23}$ between the second potential $E_2$ and the third potential $E_3$, and inputs such an amplified potential difference $\Delta E_{23}$ to the control unit 11.

Subsequently, the control unit 11 serves as a peeling determination unit to determine, based on the potential difference $\Delta E_{23}$, whether or not the potassium ion selective film 42*i* forming the potassium ion sensitive electrode 42 is peeled from the base portion 44*a*, that is, whether or not there is any K film peeling (step S107 in FIG. 4). Specifically, as illustrated in FIG. 7B, when the potential difference $\Delta E_{23}$ after five seconds from the start of contact with the standard solution is below the threshold value ΔEth (=0.01 (V)), the control unit 11 determines that the potassium ion selective film 42*i* is peeled from the base portion 44*a* (there is a K film peeling) (YES in step S107 in FIG. 4). In this case, the process proceeds to step S108 described later. As illustrated in FIG. 5B, when the potential difference $\Delta E_{13}$ after five seconds from the start of contact with the standard solution is equal to or higher than the threshold value ΔEth (=0.01 (V)), the control unit 11 determines that the potassium ion selective film 42*i* is not peeled from the base portion 44*a* (no K film peeling) (NO in step S107 in FIG. 4). In this case, the process proceeds to step S110 described later.

When it is determined that there is an Na film peeling (YES in step S104 in FIG. 4) or a K film peeling (YES in step S107 in FIG. 4), the process proceeds to step S108 as described above. In step S108, the control unit 11 serves as a notification unit to notify an occurrence of abnormality (error) indicating that the ion selective film is peeled. In this example, the control unit 11 causes the display unit 20 to display a character string "ERROR" indicating that the ion selective film is peeled. Depending on which of the sodium ion selective film 41*i* and the potassium ion selective film 42*i* is peeled, "Na_ERROR" or "K_ERROR" may be displayed, for example. When both of the sodium ion selective film 41*i* and the potassium ion selective film 42*i* are peeled, for example, "Na, K_ERROR" may be displayed to indicate that both of the films are peeled.

The user who sees a displayed notification of the occurrence of abnormality (error) can recognize that the normal measurement is impossible because of the peeling of the ion selective film. When a predetermined time (in this example, three minutes) elapses without any operation made by the user while the occurrence of abnormality is displayed (YES in step S109), the control unit 11 automatically turns off the power of the electrochemical sensor 90 (step S121).

When it is determined that there is no Na film peeling (NO in step S104 in FIG. 4) and that there is no K film peeling (NO in step S107 in FIG. 4), the process proceeds, triggered by such a determination, to step S110 as described above. Then, in step S110, the control unit 11 serves as a switching control unit to control the changeover switch 80 illustrated in FIG. 3 by the switching control signal Ctrl to switch the switching unit 80*b* from the active position to the normal position while maintaining the switching unit 80*a* in the normal position. As a result, the conduction path 83 instead of the conduction path 84 is turned on with the conduction path 81 maintained in the ON state to create the third connection state. In the third connection state, the contact electrode 21*a* of the connector 21 is electrically connected to the input part 12*a* of the potential difference measuring unit 12 via the wiring 71*a*, the conduction path 81, and the wiring 71*u*. At the same time, the contact electrode 21*b* of the connector 21 is electrically connected to the input part 12*b* of the potential difference measuring unit 12 via the wiring 71*b*, the conduction path 83, and the wiring 71*v*. Thus, as illustrated in step S111 in FIG. 4, for the standard solution, the potential difference measuring unit 12 receives the first potential $E_1$ produced by the sodium ion sensitive electrode 41 by the input part 12*a* and the second potential $E_2$ produced by the potassium ion sensitive electrode 42 by the input part 12*b*, and amplifies a potential difference ΔE between the first potential $E_1$ and the second potential $E_2$.

Figure 8:
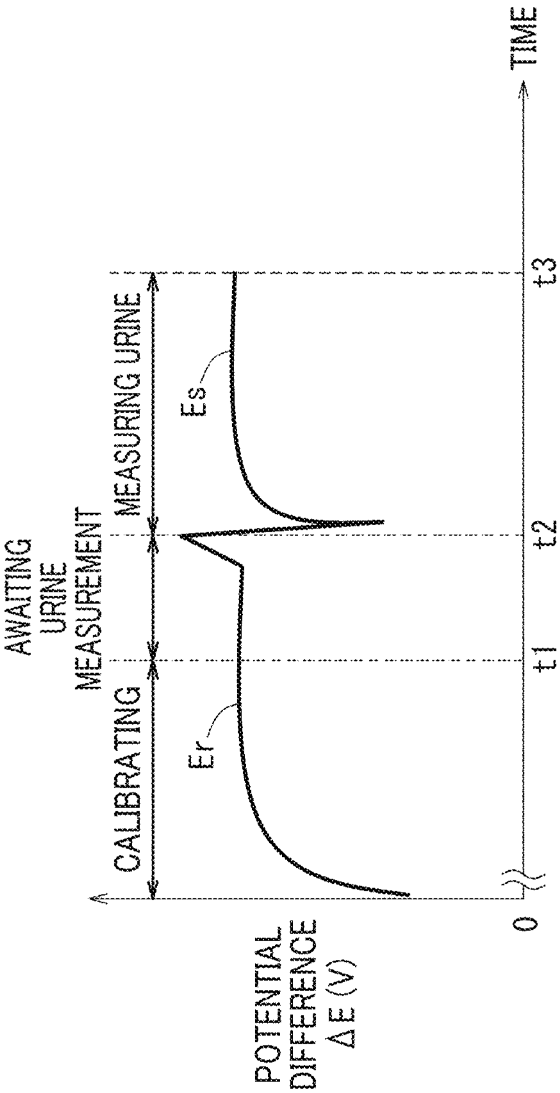
FIG. 8 is a chart illustrating a change in potential difference between the sodium ion sensitive electrode and the potassium ion sensitive electrode from a start of calibration with the standard solution to a completion of urine measurement in the flow of the electrolyte analysis method.

As a result, the control unit 11 serves as a calibration processing unit and starts an actual calibration processing. Specifically, the control unit 11 waits until the value of the potential difference ΔE for the standard solution converges (step S112 in FIG. 4). As illustrated in "CALIBRATING" period in FIG. 8, the potential difference ΔE converges to a value (in this example, Er) corresponding to the concentration ratio Mr between sodium ions and potassium ions in the standard solution (for example, fluctuation becomes 2 mV or less in 5 seconds). In this example, the potential difference ΔE converges to Er at time t1 indicated in FIG. 8. When the potential difference ΔE converges to Er (YES in step S112 in FIG. 4), the control unit 11 determines the potential difference ΔE for the standard solution to be Er, and obtains the sensitivity $S_1$ based on the above-described equation (Eq. 1) using the potential difference Er and the concentration ratio Mr (a calibration completed). Then, the user is notified that the calibration is completed. In this example, the control unit 11 causes the display unit 20 to display a character string "CAL_OK" indicating that the calibration is completed (step S113 in FIG. 4).

The user who sees the display indicating that the calibration is completed performs an operation of replacing the electrolyte that is in contact so as to integrally cover the region A1 from the standard solution to urine as a measurement target solution. The operation of replacing the electrolyte that is in contact with the region A1 from the standard solution to urine can be performed by, for example, sprinkling the urine on the side of the one end 31*e* of the test strip 30, or immersing the side of the one end 31*e* of the test strip 30 in the urine accumulated in a container (not illustrated).

By this operation, the sodium ion sensitive electrode 41 and the potassium ion sensitive electrode 42 come into contact with the urine to respectively produce the first potential $E_1$ corresponding to the concentration of sodium ions and the second potential $E_2$ corresponding to the concentration of potassium ions.

Next, the user presses the measurement switch 13*c* to give an instruction to start measuring a concentration ratio Ms ($=C_1/C_2$) between sodium ions and potassium ions in the urine (step S114 in FIG. 4). Then, the control unit 11 starts a urine measurement processing. That is, the control unit 11 serves as a second calculation unit to monitor the potential difference ΔE ($=E_1-E_2$) between the sodium ion sensitive electrode 41 and the potassium ion sensitive electrode 42 of the test strip 30 via the potential difference measuring unit 12 (step S115). As illustrated in "AWAITING URINE MEASUREMENT" period in FIG. 8, the potential difference ΔE temporarily varies as the electrolyte is replaced (in this example, at around time t2). However, as illustrated in "MEASURING URINE" period in FIG. 8, after such a temporal fluctuation, the potential difference ΔE converges again to a value (in this example, Es) corresponding to the concentration ratio between sodium ions and potassium ions included in the urine (for example, the fluctuation becomes 2 mV or less in 5 seconds). In this example, the potential difference ΔE converges to Es at time t3 indicated in FIG. 8. When the potential difference ΔE converges to Es (YES in step S116 in FIG. 4), the control unit 11 determines the potential difference ΔE for the urine to be Es (step S117 in FIG. 4).

Subsequently, the control unit 11 serves as a second calculation unit to calculate the concentration ratio Ms ($=C_1/C_2$) (that is, Na/K ratio) for urine based on the above-described equation (Eq. 1) using the sensitivity $S_1$ obtained in step S113 in FIG. 4 and the potential difference Es (step S118 in FIG. 4).

Subsequently, the control unit 11 causes the display unit 20 to display the measurement result (in this example, Na/K ratio) (step S119 in FIG. 4). For example, the Na/K ratio as a measurement result is 4.0. In this case, the display unit 20 is caused to display a character string "Na/K=4.0" indicating the measurement result. At the same time, in this example, the control unit 11 operates the communication unit 19 to transmit information indicating the measured value data (that is, Na/K ratio) to another device (in this example, a server) via the network 900.

Thereafter, the control unit 11 waits for a certain instruction to be input by the user via the operation unit 13 (step S120 in FIG. 4). When a predetermined time (in this example, three minutes) elapses without any instruction being input (YES in step S120), the control unit 11 automatically turns off the power of the electrochemical sensor 90 (step S121).

As described above, in the flow of the electrolyte analysis method using the electrochemical sensor 90, the measurement is performed in a state confirmed that there is no Na film peeling (NO in step S104 in FIG. 4) and no K film peeling (NO in step S107 of FIG. 4). Thus, reliability of measurement result (in this example, Na/K ratio) can be enhanced.

The electrochemical sensor 90 includes the test strip 30 and the main body 10 to which the test strip 30 is detachably mounted, and thus allows a way of use such as discarding a certain test strip 30 after used and mounting a new test strip to the main body 10.

In the above example, a case where the concentration ratio between sodium ions and potassium ions as the first and second ion species is measured has been described, but the present invention is not limited to this configuration. The electrochemical sensor 90 can be applied to a measurement of a concentration ratio between various ions other than sodium ions and potassium ions, such as calcium ions, chloride ions, lithium ions, nitrate ions, nitrite ions, sulfate ions, sulfite ions, iodide ions, magnesium ions, bromide ions, perchlorate ions, and hydrogen ions.

(First Exemplary Modification)

In the above example, the test strip 30 includes two ion sensitive electrodes, that is, the sodium ion sensitive electrode 41 and the potassium ion sensitive electrode 42. However, the present invention is not limited to this configuration, and only one ion sensitive electrode may be included. Specifically, for example, in FIGS. 2A and 2B, only the first main electrode layer 43, of the first and second main electrode layers 43 and 44, may be included, and only the sodium ion selective film 41*i* provided on the base portion 43*a* of the first main electrode layer 43, of the two ion selective films 41*i* and 42*i*, may be included. In this case, during the operation, the control unit 11 serves as a peeling determination unit to determine whether or not there is any Na film peeling based on the potential difference $\Delta E_{13}$ between the first potential $E_1$ produced by the sodium ion sensitive electrode 41 and the third potential $E_3$ produced by the auxiliary electrode 46. Furthermore, triggered by a determination, upon the determination, that there is no Na film peeling, the control unit 11 serves as a first calculation unit to calculate a concentration of sodium ions contained in the electrolyte based on the potential difference $\Delta E_{13}$. When measurement is performed in a state confirmed that there is no Na film peeling as described above, reliability of measurement result (in this case, sodium ion concentration) can be enhanced.

In an opposite way, only the second main electrode layer 44, of the first and second main electrode layers 43 and 44, may be included, and only the potassium ion selective film 42*i* provided on the base portion 44*a* of the second main electrode layer 44, of the two ion selective films 41*i* and 42*i*, may be included. In this case, during the operation, the control unit 11 serves as a peeling determination unit to determine whether or not there is any K film peeling based on the potential difference $\Delta E_{23}$ between the second potential $E_2$ produced by the potassium ion sensitive electrode 42 and the third potential $E_3$ produced by the auxiliary electrode 46. Furthermore, triggered by a determination, upon the determination, that there is no K film peeling, the control unit 11 serves as a first calculation unit to calculate a concentration of potassium ions contained in the electrolyte based on the potential difference $\Delta E_{23}$. When measurement is performed in a state confirmed that there is no K film peeling as described above, reliability of measurement result (in this case, potassium ion concentration) can be enhanced.

When the test strip 30 includes only one ion sensitive electrode as in the first exemplary modification, X-direction dimensions and Y-direction dimensions of the test strip 30 (substrate 31) can be reduced. In addition, the configuration of the main body 10 can be simplified.

(Second Exemplary Modification)

In the above example, the auxiliary electrode 46 (auxiliary region 51*w*3) of the test strip 30 is disposed at a location between the one end 31*e* and the potassium ion sensitive electrode 42 (second specific region 51*w*2) in the X direction, in FIGS. 2A and 2B. However, the present invention is not limited to this configuration, and the auxiliary electrode 46 may be disposed, on the side of the one end 31*e* in the X direction, for example, at a location closer to the other end 31*f* than the sodium ion sensitive electrode 41 (first specific region 51*w*1). In this case, the sodium ion sensitive electrode 41 and the potassium ion sensitive electrode 42 are disposed at places closer to the one end 31*e* in the X direction, than those in FIGS. 2A and 2B.

Even in such an arrangement, when the electrolyte is brought into contact with the side of the one end 31*e* of the substrate 31 so as to cover the side of the one end 31*e* (for example, the region A1 indicated by broken lines in FIG. 5A), the electrolyte can be brought into contact entirely with the sodium ion sensitive electrode 41, the potassium ion sensitive electrode 42, and the auxiliary electrode 46. Thus, the control unit 11 can serve as a peeling determination unit to determine whether or not there is any Na film peeling based on the potential difference $\Delta E_{13}$ between the first potential $E_1$ produced by the sodium ion sensitive electrode 41 and the third potential $E_3$ produced by the auxiliary electrode 46. Similarly, the control unit 11 can serve as a peeling determination unit to determine whether or not there is any K film peeling based on the potential difference $\Delta E_{23}$ between the second potential $E_2$ produced by the potassium ion sensitive electrode 42 and the third potential $E_3$ produced by the auxiliary electrode 46.

(Third Exemplary Modification)

In the above example, as illustrated in FIGS. 2A and 2B, in the test strip 30, all of the sodium ion sensitive electrode 41, the potassium ion sensitive electrode 42, and the auxiliary electrode 46 are provided on the front surface 31*a*, which is one main surface of the substrate 31, but the present invention is not limited to this configuration. For example, in the test strip 30, the sodium ion sensitive electrode 41 and the potassium ion sensitive electrode 42 are provided on the front surface 31*a* of the substrate 31, while the auxiliary electrode 46 may be provided on the rear surface 31*b*, which is the other main surface of the substrate 31. In this case, the base portion 43*a* and the electrode pad 43*c* associated with the sodium ion sensitive electrode 41, and the base portion 44*a* and the electrode pad 44*c* associated with the potassium ion sensitive electrode 42 are provided on the front surface 31*a* of the substrate 31 like in the above example. The auxiliary electrode layer 48 including the auxiliary electrode 46, the lead portion 48*b*, and the electrode pad 48*c* is provided on the rear surface 31*b* of the substrate 31. In addition, the connector 21 of the main body 10 has three contact electrodes that correspondingly come into contact with the electrode pad 43*c* and the electrode pad 44*c* on the front surface 31*a* of the substrate 31 and the electrode pad 48*c* on the rear surface 31*b* of the substrate 31, when the side of the other end 31*f* of the substrate 31 is inserted in the connector 21.

As described above, in the test strip 30, in a case where the sodium ion sensitive electrode 41 and the potassium ion sensitive electrode 42 are provided on the front surface 31*a* of the substrate 31, while the auxiliary electrode 46 is provided on the rear surface 31*b* of the substrate 31, a number of components provided on the front surface 31*a* of the substrate 31 is reduced, so that a dimension of the test strip 30 in the Y-direction can be reduced.

(Fourth Exemplary Modification)

In the above example, as illustrated in FIG. 2A, the auxiliary electrode 46 (auxiliary region 51*w*3) of the test strip 30 has a shape of circular, but the present invention is not limited to this configuration. The shape of the auxiliary electrode 46 (auxiliary region 51$w$3) may be, for example, rectangular.

As described above, an electrolyte analysis device of the present disclosure is an electrolyte analysis device for measuring a concentration of ions contained in an electrolyte, the electrolyte analysis device comprising:

a substrate extending in one direction from one end to an other end;

a main electrode layer including a main base portion and a main extension portion provided on one main surface of a pair of main surfaces of the substrate, the main base portion being provided in a specific region on a side of the one end in the one direction, the main extension portion extending from the main base portion to a side of the other end;

an ion selective film provided to be in contact with the main base portion so as to cover the main base portion in the specific region, the ion selective film having a property of selectively allowing the ions to pass through the ion selective film; and an auxiliary electrode layer including an auxiliary base portion and an auxiliary extension portion provided on the one main surface or an other main surface of the pair of main surfaces of the substrate, the auxiliary base portion being provided in an auxiliary region different from the specific region and on the side of the one end in the one direction, the auxiliary extension portion extending from the auxiliary base portion to the side of the other end, wherein the auxiliary electrode layer is disposed in a state separated from the main electrode layer, and the electrolyte analysis device further comprises a peeling determination unit that obtains, in a state where the electrolyte is in contact with the side of the one end of the substrate so as to cover the side of the one end, a potential of the main base portion via the main extension portion and a potential of the auxiliary base portion via the auxiliary extension portion, respectively, and determines whether or not the ion selective film is peeled from the main base portion based on a potential difference between an obtained potential of the main base portion and an obtained potential of the auxiliary base portion.

The "electrolyte" broadly means a solution containing at least one ion species.

"A pair of main surfaces" of the substrate means plate surfaces (for example, a front surface and a rear surface) that spatially expand and is not an end surface.

The "side of the one end" means a side close to the one end, of the one end and the other end, regarding the one direction. The "side of the other end" means a side close to the other end, of the one end and the other end, regarding the one direction.

The ion selective film having a "property of selectively allowing . . . ions to pass therethrough" means that the ion selective film has a property of allowing a specific ion species to pass therethrough, without allowing water to pass therethrough. For example, this property may be a property of selectively allowing sodium ions ($Na^{+}$) to pass therethrough, without allowing water to pass therethrough, or, a property of selectively allowing potassium ions ($K^{+}$) to pass through, without allowing water to pass therethrough, etc.

To bring the electrolyte into "contact" with the side of the one end of the substrate so as to cover the side of the one end, a user (typically, a subject) may sprinkle the electrolyte on the side of the one end of the substrate so as to cover the side of the one end, or may immerse the side of the one end of the substrate in the electrolyte.

The ion selective film "is peeled" from the main base portion means that the ion selective film is not in contact with the main base portion so as to cover the main base portion. This includes not only a state where the entire ion selective film is peeled from the main base portion but also a state where a part of the ion selective film is peeled from the main base portion. For example, in a case where there is no "peeling", the electrolyte does not directly contact with the main base portion, even when the electrolyte is brought into contact with the side of the one end of the substrate so as to cover the side of the one end. Whereas, in a case where there is a "peeling", the electrolyte directly contacts the main base portion, when the electrolyte is brought into contact with the side of the one end of the substrate so as to cover the side of the one end.

When using the electrolyte analysis device of the present disclosure, an electrolyte is brought into contact with the side of the one end of the substrate so as to cover the side of the one end. The electrolyte thereby comes into contact so as to integrally cover the ion selective film (if there exists) on the main base portion and the auxiliary base portion. In this state, the peeling determination unit obtains a potential of the main base portion via the main extension portion and a potential of the auxiliary base portion via the auxiliary extension portion. As a general phenomenon, in a case where the ion selective film is in contact with the main base portion so as to cover the main base portion (that is, when there is no "peeling" of the ion selective film), a potential difference corresponding to a property of the ion selective film (a property of selectively allowing ions to pass through) is produced between an obtained potential of the main base portion and an obtained potential of the auxiliary base portion. Whereas, in a case where the ion selective film is peeled from the main base portion (when at least a part of the ion selective film is peeled), no such potential difference is produced between the obtained potential of the main base portion and the obtained potential of the auxiliary base portion. Thus, the peeling determination unit determines whether or not the ion selective film is peeled from the main base portion based on the potential difference between the obtained potential of the main base portion and the obtained potential of the auxiliary base portion. Specifically, when a potential difference corresponding to the property of the ion selective film (the property of selectively allowing ions to pass through) is produced between the obtained potential of the main base portion and the obtained potential of the auxiliary base portion, the peeling determination unit determines that the ion selective film is in contact with and covering the main base portion, that is, the ion selective film is not peeled from the main base portion (no film peeling). When no such potential difference is produced between the obtained potential of the main base portion and the obtained potential of the auxiliary base portion, the peeling determination unit determines that the ion selective film is peeled from the main base portion (there is a film peeling). In this manner, the electrolyte analysis device can determine whether or not the ion selective film is peeled from the main base portion, that is, from the electrode layer as a base. After confirming that there is no film peeling, a concentration of ions contained in the electrolyte can be measured. Thus, reliability of measurement result can be enhanced.

In the electrolyte analysis device of one embodiment, a conductive material forming the main base portion is same as a conductive material forming the auxiliary base portion.

In the electrolyte analysis device of this one embodiment, the conductive material forming the main base portion is the same as the conductive material forming the auxiliary base portion, so that, in a case where the ion selective film is peeled from the main base portion (in a case where at least a part of the ion selective film is peeled), the potential difference between the obtained potential of the main base portion and the obtained potential of the auxiliary base portion is substantially zero. Thus, whether or not the ion selective film is peeled from the main base portion can be determined with high accuracy.

In the electrolyte analysis device of one embodiment, the peeling determination unit determines whether or not the ion selective film is peeled from the main base portion based on whether or not the potential difference is below a predetermined threshold value.

In the electrolyte analysis device of this one embodiment, the peeling determination unit determines whether or not the ion selective film is peeled from the main base portion based on whether or not the potential difference is below a predetermined threshold value. Thus, the above determination can be made by simple processing.

The electrolyte analysis device of one embodiment further comprises a notification unit that gives a notification of an occurrence of abnormality indicating that the ion selective film is peeled when it is determined that the ion selective film is peeled from the main base portion.

In the electrolyte analysis device of this one embodiment, when it is determined that the ion selective film is peeled from the main base portion, the notification unit gives a notification of the occurrence of abnormality indicating that the ion selective film is peeled. Thus, the user can recognize that normal measurement is impossible because the ion selective film is peeled. In this case, it is desirable that the electrolyte analysis device does not perform any measurement of ion concentration.

The electrolyte analysis device of one embodiment further comprises a first calculation unit that calculates, triggered by a determination, upon the determination, that the ion selective film is not peeled from the main base portion, the concentration of the ions contained in the electrolyte based on the potential difference between the potential of the main base portion and the potential of the auxiliary base portion.

In the electrolyte analysis device of this one embodiment, when it is determined that the ion selective film is not peeled from the main base portion, the first calculation unit calculates, triggered by the above determination, the concentration ratio of the ions contained in the electrolyte based on the potential difference between the potential of the main base portion and the potential of the auxiliary base portion. When measurement is performed in a state confirmed that the ion selective film is not peeled from the main base portion as described above, reliability of measurement result (ion concentration) can be enhanced.

In the electrolyte analysis device of one embodiment,
- the electrolyte contains a first ion species and a second ion species different from each other,
- the specific region includes a first specific region and a second specific region separated from each other on the side of the one end in the one direction on the one main surface,
- the main electrode layer includes, on the one main surface of the substrate,
  - a first main base portion provided in the first specific region, and a first main extension portion extending from the first main base portion to the side of the other end, and
  - a second main base portion provided in the second specific region, and a second main extension portion extending from the second main base portion to the side of the other end,
  - the first main base portion and the first main extension portion being disposed in a state separated from the second main base portion and the second main extension portion,
- the ion selective film includes
  - a first ion selective film provided to be in contact with the first main base portion so as to cover the first main base portion in the first specific region, the first ion selective film having a property of selectively allowing the first ion species to pass through the first ion selective film, and
  - a second ion selective film provided to be in contact with the second main base portion so as to cover the second main base portion in the second specific region, the second ion selective film having a property of selectively allowing the second ion species to pass through the second ion selective film, and
- the peeling determination unit
  - obtains, in a state in which the electrolyte is in contact with the side of the one end of the substrate so as to cover the side of the one end, a first potential indicated by the first main base portion via the first main extension portion, a second potential indicated by the second main base portion via the second main extension portion, and a third potential indicated by the auxiliary base portion via the auxiliary extension portion, respectively, and
  - determines whether or not the first ion selective film is peeled from the first main base portion based on a potential difference between an obtained first potential and an obtained third potential, and whether or not the second ion selective film is peeled from the second main base portion based on a potential difference between an obtained second potential and the obtained third potential.

When using the electrolyte analysis device of this one embodiment, the electrolyte is brought into contact with the side of the one end of the substrate so as to cover the side of the one end. Then, the electrolyte comes into contact with the first ion selective film (if exists) on the first main base portion, the second ion selective film (if exists) on the second main base portion, and the auxiliary base portion so as to integrally cover them. In this state, the peeling determination unit obtains a first potential indicated by the first main base portion via the first main extension portion, a second potential indicated by the second main base portion via the second main extension portion, and a third potential indicated by the auxiliary base portion via the auxiliary extension portion, respectively. Here, as a general phenomenon, in a case where the first ion selective film is in contact with the first main base portion so as to cover the first main base portion (that is, when there is no "peeling" of the first ion selective film), a potential difference corresponding to a property of the first ion selective film (a property of selectively allowing the first ion species to pass through) is produced between an obtained first potential and an obtained third potential. Whereas, in a case where the first ion selective film is peeled from the first main base portion (when at least a part of the first ion selective film is peeled), no such potential difference is produced between the obtained first potential and the obtained third potential. Also, in a case where the second ion selective film is in contact with the second main base portion so as to cover the second main base portion (that is, when there is no "peeling" of the second ion selective film), a potential difference corresponding to a property of the second ion selective film (a property of selectively allowing the second ion species to pass through) is produced between an obtained second potential and the obtained third potential. Whereas, in a case where the second ion selective film is peeled from the second main base portion (when at least a part of the second ion selective film is peeled), no such potential difference is produced between the obtained second potential and the obtained third potential. Thus, the peeling determination unit determines whether or not the first ion selective film is peeled from the first main base portion based on the potential difference between the obtained first potential and the obtained third potential, and whether or not the second ion selective film is peeled from the second main base portion based on the potential difference between the obtained second potential and the obtained third potential. Specifically, when the potential difference corresponding to the property of the first ion selective film (the property of selectively allowing the first ion species to pass through) is produced between the obtained first potential and the obtained third potential, the peeling determination unit determines that the first ion selective film is in contact with and covering the first main base portion, that is, the first ion selective film is not peeled from the first main base portion. When no such potential difference is produced between the obtained first potential and the obtained third potential, the peeling determination unit determines that the first ion selective film is peeled from the first main base portion. Meanwhile, when the potential difference corresponding to the property of the second ion selective film (the property of selectively allowing the second ion species to pass through) is produced between the obtained second potential and the obtained third potential, the peeling determination unit determines that the second ion selective film is in contact with and covering the second main base portion, that is, the second ion selective film is not peeled from the second main base portion. When no such potential difference is produced between the obtained second potential and the obtained third potential, the peeling determination unit determines that the second ion selective film is peeled from the second main base portion. In this manner, the electrolyte analysis device can determine whether or not the first ion selective film is peeled from the first main base portion and whether or not the second ion selective film is peeled from the second main base portion.

The electrolyte analysis device of one embodiment further comprises a second calculation unit that calculates, triggered by a determination, upon the determination, that the first ion selective film is not peeled from the first main base portion and the second ion selective film is not peeled from the second main base portion, a concentration ratio between the first ion species and the second ion species contained in the electrolyte based on a potential difference between the first potential and the second potential.

In the electrolyte analysis device of this one embodiment, when it is determined that the first ion selective film is not peeled from the first main base portion and the second ion selective film is not peeled from the second main base portion, the second calculation unit calculates, triggered by the above determination, the concentration ratio between the first ion species and the second ion species contained in the electrolyte based on the potential difference between the first potential and the second potential. When measurement is performed in a state confirmed that the first and second ion selective films are not peeled from the first and second main base portions, respectively, as described above, reliability of measurement result (the concentration ratio) can be enhanced.

The electrolyte analysis device of one embodiment further comprises

- a test strip including the substrate, the main electrode layer, the ion selective film, and the auxiliary electrode layer; and
- a main body to which the test strip is detachably mounted, wherein
- the main body includes
  - a connector including a first contact electrode, a second contact electrode, and a third contact electrode that respectively come into contact with the first main extension portion, the second main extension portion, and the auxiliary extension portion when the side of the other end of the test strip is inserted in the connector, wherein
- the peeling determination unit and the second calculation unit are mounted on the main body.

The electrolyte analysis device of this one embodiment comprises the test strip and the main body to which the test strip is detachably mounted. Here, when the side of the other end of the test strip is inserted in the connector of the main body, the first, second, and third contact electrodes of the connector come in contact with the first main extension portion, the second main extension portion, and the auxiliary extension portion of the test strip, respectively. Thus, the peeling determination unit can obtain the first potential, the second potential, and the third potential via the first, second, and third contact electrodes, respectively. The peeling determination unit determines whether or not the first ion selective film is peeled from the first main base portion based on the potential difference between the obtained first potential and the obtained third potential, and can determine whether or not the second ion selective film is peeled from the second main base portion based on the potential difference between the obtained second potential and the obtained third potential. Furthermore, the second calculation unit can calculate the concentration ratio between the first ion species and the second ion species contained in the electrolyte based on the potential difference between the first potential and the second potential. The electrolyte analysis device of this one embodiment includes the test strip and the main body to which the test strip is detachably mounted, and thus allows a way of use such as discarding a certain test strip after used and mounting a new test strip to the main body.

In the electrolyte analysis device of one embodiment,

- the main body includes
  - a wiring group for connecting the first contact electrode, the second contact electrode, and the third contact electrode of the connector to the peeling determination unit and the second calculation unit,
  - a changeover switch interposed in the wiring group, and
  - a switching control unit, wherein
- the switching control unit controls the changeover switch to
  - sequentially create, for the peeling determination unit, a first connection state in which the first contact electrode and the third contact electrode of the connector are electrically connected to the peeling determination unit via the wiring group, and a second connection state in which the second contact electrode and the third contact electrode are electrically connected to the peeling determination unit via the wiring group, and create, for the second calculation unit, a third connection state in which the first contact electrode and the second contact electrode of the connector are connected to the second calculation unit via the wiring group.

In the electrolyte analysis device of this one embodiment, the control unit controls the changeover switch to sequentially create, for the peeling determination unit, the first connection state in which the first contact electrode and the third contact electrode of the connector are electrically connected to the peeling determination unit via the wiring group, and the second connection state period in which the second contact electrode and the third contact electrode are electrically connected to the peeling determination unit via the wiring group. Thus, in the first connection state, the peeling determination unit obtains the first potential and the third potential via the first and third contact electrodes, respectively, and can determine whether or not the first ion selective film is peeled from the first main base portion based on the potential difference between the obtained first potential and the obtained third potential. Subsequently, in the second connection state, the peeling determination unit obtains the second potential and the third potential via the second and third contact electrodes, respectively, and can determine whether or not the second ion selective film is peeled from the second main base portion based on the potential difference between the obtained second potential and the obtained third potential. Furthermore, the control unit controls the changeover switch to create, for the second calculation unit, the third connection state in which the first contact electrode and the second contact electrode of the connector are connected to the second calculation unit via the wiring group. Thus, in the third connection state, the second calculation unit obtains the first potential and the second potential via the first and second contact electrodes, respectively, and can calculate the concentration ratio between the first ion species and the second ion species contained in the electrolyte based on the potential difference between the obtained first potential and the obtained second potential.

In the electrolyte analysis device of one embodiment, the auxiliary electrode layer is provided on the one main surface of the pair of main surfaces.

In the electrolyte analysis device of this one embodiment, the auxiliary electrode layer is provided on one main surface of a pair of main surfaces. Thus, in forming of the electrode layer at a manufacturing stage of the electrolyte analysis device, the main electrode layer and the auxiliary electrode layer can be simultaneously formed on the one main surface by, for example, a screen printing method. In addition, in a use stage of the electrolyte analysis device, when the user brings the electrolyte into contact with the side of the one end of the substrate so as to cover the side of the one end, if the electrolyte is in contact even only with the one main surface, then the peeling determination unit can determine whether or not the ion selective film is peeled from the main base portion.

In another aspect, an electrolyte analysis method of the present disclosure is an electrolyte analysis method for measuring a concentration of ions contained in an electrolyte, the electrolyte analysis method preparing a substrate extending in one direction from one end to an other end, a main electrode layer including a main base portion and a main extension portion provided on one main surface of a pair of main surfaces of the substrate, the main base portion being provided in a specific region on a side of the one end in the one direction, the main extension portion extending from the main base portion to a side of the other end, an ion selective film provided to be in contact with the main base portion so as to cover the main base portion in the specific region, the ion selective film having a property of selectively allowing the ions to pass through the ion selective film, and an auxiliary electrode layer including an auxiliary base portion and an auxiliary extension portion provided on the one main surface or an other main surface of the pair of main surfaces of the substrate, the auxiliary base portion being provided in an auxiliary region different from the specific region and on the side of the one end in the one direction, the auxiliary extension portion extending from the auxiliary base portion to the side of the other end, are included, wherein the auxiliary electrode layer is disposed in a state separated from the main electrode layer, and the electrolyte analysis method comprising:

obtaining, in a state where the electrolyte is in contact with the side of the one end of the substrate so as to cover the side of the one end, a potential of the main base portion via the main extension portion and a potential of the auxiliary base portion via the auxiliary extension portion, respectively; and determining whether or not the ion selective film is peeled from the main base portion based on a potential difference between an obtained potential of the main base portion and an obtained potential of the auxiliary base portion.

According to the electrolyte analysis method of the disclosure, it can be determined whether or not the ion selective film is peeled from the main base portion, that is, from the electrode layer as a base.

As is apparent from the above, according to the electrolyte analysis device and the electrolyte analysis method of the disclosure, it can be determined whether or not the ion selective film is peeled from the electrode layer as a base.

The above embodiments are illustrative, and are modifiable in a variety of ways without departing from the scope of this invention. It is to be noted that the various embodiments described above can be appreciated individually within each embodiment, but the embodiments can be combined together. It is also to be noted that the various features in different embodiments can be appreciated individually by its own, but the features in different embodiments can be combined.

The invention claimed is:

1. An electrolyte analysis device for measuring a concentration of ions contained in an electrolyte, the electrolyte analysis device comprising:

a substrate extending in one direction from a first end to a second end;

a main electrode layer including a main base portion and a main extension portion provided on a first main surface of a pair of main surfaces of the substrate, the main base portion being provided in a specific region on a side of the first end in the one direction, the main extension portion extending from the main base portion to a side of the second end;

an ion selective film provided to be in contact with the main base portion so as to cover the main base portion in the specific region, the ion selective film having a property of selectively allowing the ions to pass through the ion selective film; and an auxiliary electrode layer including an auxiliary base portion and an auxiliary extension portion provided on the first main surface or a second main surface of the pair of main surfaces of the substrate, the auxiliary base portion being provided in an auxiliary region different from the specific region and on the side of the first end in the one direction, the auxiliary extension portion extending from the auxiliary base portion to the side of the second end, wherein the auxiliary electrode layer is disposed in a state separated from the main electrode layer, the electrolyte analysis device further comprises:

a connector including contact electrodes respectively corresponding to and contacting the main extension portion and the auxiliary extension portion;

a control unit including a processor;

a wiring group electrically connecting the contact electrodes to the control unit; and a changeover switch interposed in the wiring group, the control unit is configured, in a state where the electrolyte is in contact with the side of the first end of the substrate so as to cover the side of the first end, to control the changeover switch to selectively create:

(i) a peeling determination connection state in which the main base portion and the auxiliary base portion are electrically connected to the control unit via the wiring group and the control unit obtains a potential of the main base portion via the main extension portion and a potential of the auxiliary base portion, and (ii) a measurement connection state in which the potential of the main base portion is supplied to the control unit via the wiring group and the control unit performs measurement of the concentration of ions, and the control unit is further configured to, in the peeling determination connection state:

obtain a potential difference that is a difference between the potential of the main base portion and the potential of the auxiliary base portion, compare the obtained potential difference with a predetermined threshold value, and determines whether or not the ion selective film is peeled from the main base portion based on a result of the comparison.

2. The electrolyte analysis device according to claim 1, wherein a conductive material forming the main base portion is a same material as a conductive material forming the auxiliary base portion.

3. The electrolyte analysis device according to claim 1, wherein the peeling determination control unit determines whether or not the ion selective film is peeled from the main base portion based on whether or not the potential difference is below the predetermined threshold value.

4. The electrolyte analysis device according to claim 1, wherein the control unit is configured to function as a notification unit to provide a notification of an occurrence of abnormality indicating that the ion selective film is peeled when it is determined that the ion selective film is peeled from the main base portion.

5. The electrolyte analysis device according to claim 1, wherein when it is determined that the ion selective film is not peeled from the main base portion, the control unit is configured to function as a first calculation unit to calculates, triggered by determining that the ion selective film is not peeled from the main base portion, the concentration of the ions contained in the electrolyte based on the potential difference between the potential of the main base portion and the potential of the auxiliary base portion.

6. The electrolyte analysis device according to claim 1, wherein the electrolyte contains a first ion species and a second ion species different from each other, the specific region includes a first specific region and a second specific region separated from each other on the side of the first end in the one direction on the first main surface, the main electrode layer includes, on the first main surface of the substrate, a first main base portion provided in the first specific region, and a first main extension portion extending from the first main base portion to the side of the second end, and a second main base portion provided in the second specific region, and a second main extension portion extending from the second main base portion to the side of the second end, the first main base portion and the first main extension portion being disposed in a state separated from the second main base portion and the second main extension portion, the ion selective film includes a first ion selective film provided to be in contact with the first main base portion so as to cover the first main base portion in the first specific region, the first ion selective film having a property of selectively allowing the first ion species to pass through the first ion selective film, and a second ion selective film provided to be in contact with the second main base portion so as to cover the second main base portion in the second specific region, the second ion selective film having a property of selectively allowing the second ion species to pass through the second ion selective film, the connector includes first, second, and third contact electrodes respectively corresponding to and contacting the first main extension portion, the second main extension portion, and the auxiliary extension portion, the control unit is configured, in a state in which the electrolyte is in contact with the side of the first end of the substrate so as to cover the side of the first end, to control the changeover switch to selectively create, as the peeling determination connection state:

a first peeling determination connection state in which the first main base portion and the auxiliary base portion are electrically connected to the control unit via the wiring group and the control unit obtains a potential of the first main base portion and a potential of the auxiliary base portion, and a second peeling determination connection state in which the second main base portion and the auxiliary base portion are electrically connected to the control unit via the wiring group and the control unit obtains a potential of the second main base portion and a potential of the auxiliary base portion;

the control unit is further configured to:

obtain, in the first peeling determination connection state, a first potential difference that is a difference between the potential of the first main base portion and the potential of the auxiliary base portion, compare the obtained first potential difference with a predetermined first threshold value, determine whether or not the first ion selective film is peeled from the first main base portion based on a result of the comparison, obtain, in the second peeling determination connection state, a second potential difference that is a difference between the potential of the second main base portion and the potential of the auxiliary base portion, compare the obtained second potential difference with a predetermined second threshold value, and determine whether or not the second ion selective film is peeled from the second main base portion based on a result of the comparison.

7. The electrolyte analysis device according to claim 6, wherein when it is determined that the first ion selective film is not peeled from the first main base portion and the second ion selective film is not peeled from the second main base portion, the control unit is configured to function as a second calculation unit to calculate, triggered by determining that the first ion selective film is not peeled from the first main base portion and the second ion selective film is not peeled from the second main base portion, a concentration ratio between the first ion species and the second ion species contained in the electrolyte based on a potential difference between the potential of the first main base portion and the potential of the second main base portion.

8. The electrolyte analysis device according to claim 7, further comprising:

a test strip including the substrate, the main electrode layer, the ion selective film, and the auxiliary electrode layer; and a main body to which the test strip is detachably mounted, wherein the main body includes the control unit.

9. The electrolyte analysis device according to claim 1, wherein the auxiliary electrode layer is provided on the first main surface of the pair of main surfaces.

* * * * *